United States Patent
Liu et al.

(10) Patent No.: US 10,440,739 B2
(45) Date of Patent: Oct. 8, 2019

(54) MESSAGE TRANSMITTING OR RECEIVING METHODS AND DEVICES, BASE STATION, AND TERMINAL

(71) Applicant: ZTE Corporation, Shenzhen (CN)

(72) Inventors: Wenhao Liu, Shenzhen (CN); Senbao Guo, Shenzhen (CN); Zhaohua Lu, Shenzhen (CN); Feng Bi, Shenzhen (CN); Guanghui Yu, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 340 days.

(21) Appl. No.: 15/521,479

(22) PCT Filed: Jul. 30, 2015

(86) PCT No.: PCT/CN2015/085632
§ 371 (c)(1),
(2) Date: Apr. 24, 2017

(87) PCT Pub. No.: WO2016/062147
PCT Pub. Date: Apr. 28, 2016

(65) Prior Publication Data
US 2017/0339718 A1 Nov. 23, 2017

(30) Foreign Application Priority Data
Oct. 24, 2014 (CN) .......................... 2014 1 0583730

(51) Int. Cl.
*H04W 74/00* (2009.01)
*H04B 1/7073* (2011.01)
(Continued)

(52) U.S. Cl.
CPC ........ *H04W 74/004* (2013.01); *H04B 1/7073* (2013.01); *H04W 74/00* (2013.01); *H04W 74/08* (2013.01); *H04W 74/04* (2013.01)

(58) Field of Classification Search
CPC .................................................... H04B 1/7073
See application file for complete search history.

(56) References Cited

U.S. PATENT DOCUMENTS

2008/0232329 A1* 9/2008 Jen ...................... H04W 74/002
370/335
2009/0042582 A1* 2/2009 Wang ................ H04W 74/0866
455/450
(Continued)

FOREIGN PATENT DOCUMENTS

| CN | 101640922 A | 2/2010 |
| CN | 101772182 A | 7/2010 |
| EP | 2555568 A2 | 2/2013 |

OTHER PUBLICATIONS

International Search Report for corresponding application PCT/CN2015/085632 filed on Jul. 30, 2015; dated Oct. 30, 2015.

*Primary Examiner* — Jamaal Henson
(74) *Attorney, Agent, or Firm* — Cantor Colburn LLP

(57) ABSTRACT

Provided are message transmitting or receiving methods and devices, a base station, and a terminal. Uplink access signals are divided into a first pre-determined number of uplink access signal groups. An uplink access signal, which is transmitted in an uplink access beam form based on one or more uplink access signal groups, is received from a second communication node. An uplink access signal group to which the uplink access signal pertains is determined. One or more uplink access signals contained in the uplink access signal group are transmitted under at least one of the following restriction conditions: a restricted sequence transmitting order, a restricted transmitting occasion, and a restricted transmitting frequency domain position. An uplink access response message is transmitted to the second communication node over an uplink access response resource corresponding to the determined uplink access signal group.

21 Claims, 11 Drawing Sheets

(51) Int. Cl.
*H04W 74/08* (2009.01)
*H04W 74/04* (2009.01)

(56) References Cited

U.S. PATENT DOCUMENTS

| | | | |
|---|---|---|---|
| 2009/0268666 A1* | 10/2009 | Vujcic | H04W 74/0833 370/328 |
| 2013/0044657 A1* | 2/2013 | Oh | H04W 74/0875 370/310 |
| 2014/0086213 A1* | 3/2014 | Kwon | H04W 36/0055 370/331 |
| 2014/0112254 A1* | 4/2014 | Lindoff | H04W 74/002 370/328 |

* cited by examiner

MESSAGE TRANSMITTING OR RECEIVING METHODS AND DEVICES, BASE STATION, AND TERMINAL

TECHNICAL FIELD

The present disclosure relates to the field of communications, and more particularly to message transmitting or receiving methods and devices, a base station, and a terminal.

BACKGROUND

In the field of communications, compared with a traditional Long Term Evolution (LTE) system, if a higher carrier frequency is adopted for transmission in mobile communications, an average path loss may be much larger than that of the traditional LTE system. For example, when a carrier frequency of 28 GHz is adopted for transmission, a path loss is calculated by utilizing Formula (1):

$$L_f = \left(\frac{4\pi R}{\lambda}\right)^2 \quad (1)$$

where, R is a radius of cell coverage, and $\lambda$ is a wavelength of a corresponding carrier.

Information of an average ratio of a high-frequency path loss value to an LTE path loss value is calculated as follows.

$$L_H/L_L = \left(\frac{4\pi R}{\lambda_H}\right)^2 \Big/ \left(\frac{4\pi R}{\lambda_L}\right)^2 = \left(\frac{\lambda_L}{\lambda_H}\right)^2 \approx 100 \quad (2)$$

where, $L_H$ is a high-frequency path loss, and $L_L$ is a low-frequency path loss.

In high-frequency communications, in order to ensure coverage, i.e., to ensure that a receiving side meets a minimum Signal to Interference plus Noise Ratio (SINR) requirement, it may be needed to increase gains of a transmitter and a receiver.

$$P_r = P_t G_t G_r \left(\frac{\lambda}{4\pi R}\right)^2 = P_t G_t G_r / L_f \quad (3)$$

where, $P_r$ is receiving power, $P_t$ is transmitting power, $G_t$ is a transmitting antenna gain, and $G_r$ is a receiving antenna gain.

LTE communications require a maximum coverage for 100 km. If an average path loss (open area) is only taken into consideration according to maximum coverage, high-frequency communications may maximally achieve a coverage area for 1 km. If the characteristics of air absorption (oxygen absorption, carbon dioxide, etc.), rain fading, shadow fading sensitivity, etc. of actual high-frequency carriers are taken into consideration, coverage capable of being actually supported may be less than 1 km.

If the high-frequency communications support maximum coverage for 1 km, compared with the LTE system, SINRs that can be achieved under the same coverage area are different. For example, the SINR of high-frequency communications is less than the SINR of the LTE system by at least 20 dB. In order to ensure that the high-frequency communications and the LTE system have similar SINRs within a coverage range, it may be needed to ensure antenna gains of the high-frequency communications. As the high-frequency communications have a shorter wavelength, more antenna elements may be accommodated in unit area, and more antenna elements may provide higher antenna gains, thus ensuring the coverage performance of the high-frequency communications.

In the field of communications, a second communication node serving as a transmitting end may transmit a plurality of uplink access signals to a first communication node serving as a receiving end. However, in view of a current technology, the first communication node cannot learn of whether the received uplink access signals come from the same second communication node, thus increasing overheads of an access process to result in that the first communication node cannot respond to more uplink accesses.

Any effective solution has not been proposed yet at present for the problem in the field of communications where the first communication node cannot respond to more uplink accesses.

SUMMARY

Some embodiments of the present disclosure provide a message transmitting method, a message receiving method, a message transmitting device, a message receiving device, a base station, and a terminal, intended to solve, at least, the problem in the field of communications where a first communication node cannot respond to more uplink accesses.

According to an embodiment of the present disclosure, a message transmitting method is provided, which may include the following acts. Uplink access signals are divided into a first pre-determined number of uplink access signal groups, and the uplink access signal groups correspond to pre-determined uplink access response resources. An uplink access signal, which is transmitted in an uplink access beam form based on one or more uplink access signal groups, is received from a second communication node, where the one or more uplink access signal groups are selected by the second communication node according to a division result. An uplink access signal group to which the uplink access signal pertains is determined. One or more uplink access signals contained in the uplink access signal group being transmitted under at least one of the following restriction conditions: a restricted sequence transmitting order, a restricted transmitting occasion, and a restricted transmitting frequency domain position. An uplink access response message is transmitted to the second communication node over an uplink access response resource corresponding to the determined uplink access signal group.

In an exemplary embodiment, the act of dividing the uplink access signals into the first pre-determined number of uplink access signal groups may include at least one of the following acts. An uplink access signal group to which each uplink access signal pertains is determined in a manner of informing, by the first communication node, the second communication node. An uplink access signal group to which each uplink access signal pertains is determined in a manner of making an appointment between the first communication node and the second communication node.

In an exemplary embodiment, the act of informing, by the first communication node, the second communication node may include at least one of the following acts. The second communication node is informed via a broadcast channel of the first communication node. The second communication node is informed, by one or more other first communication nodes in connection with the second communication node, via respective broadcast channels of the one or more other first communication nodes. The second communication node is informed, by one or more other first communication nodes in connection with the second communication node, via high-layer signaling.

In an exemplary embodiment, the act of determining the uplink access signal group to which the uplink access signal pertains may include the following acts. Whether at least one of a transmitting occasion, a transmitting order or a transmitting frequency domain position of the uplink access signal has pre-determined correspondence with at least one of a transmitting occasion, a transmitting order or a transmitting frequency domain position of a pre-determined uplink access signal group is judged. When the pre-determined correspondence exists, it is determined that the uplink access signal pertains to the pre-determined uplink access signal group.

In an exemplary embodiment, the act of transmitting the uplink access response message to the second communication node may include the following acts. A pre-determined number of detection threshold values are set, and the detection threshold values are used for representing quality of the uplink access signal. The received uplink access signal transmitted from the second communication node is detected. A response message containing a detection threshold value corresponding to the detection result is transmitted to the second communication node according to a detection result; or, when the number of the set detection threshold values is 1, a response message that does not contain the detection threshold value is transmitted to the second communication node according to a detection result.

In an exemplary embodiment, the act of dividing the uplink access signals into the first pre-determined number of uplink access signal groups may include the following acts. The uplink access signal groups are divided into a second pre-determined number of grades. The uplink access signals are divided into the first pre-determined number of uplink access signal groups according to the divided grades. In this exemplary embodiment, different numbers of uplink access signals are divided in uplink access signal groups under different grades; the same number of uplink access signals is divided in uplink access signal groups under an identical grade, or the difference of numbers of the uplink access signals divided in the uplink access signal groups under the identical grade is smaller than a pre-determined threshold number.

According to another embodiment of the present disclosure, a message receiving method is provided, which may include the following acts. A division result of dividing uplink access signals into a first pre-determined number of uplink access signal groups is determined, in the embodiment, the uplink access signal groups correspond to pre-determined uplink access response resources. One or more uplink access signal groups are selected according to the division result to transmit an uplink access signal to a first communication node in an uplink access beam form. One or more uplink access signals contained in the selected uplink access signal group are transmitted under at least one of the following restriction conditions: a restricted sequence transmitting order, a restricted transmitting occasion, and a restricted transmitting frequency domain position. An uplink access response message, which is fed back by the first communication node according to the uplink access signal, is received over an uplink access response resource corresponding to the selected uplink access signal group.

In an exemplary embodiment, the act of determining the division result of dividing uplink access signals into the first pre-determined number of uplink access signal groups may include at least one of the following acts. The division result transmitted by the first communication node and obtained by dividing the uplink access signals by the first communication node is received. The division result is determined in a manner of making an appointment with the first communication node.

In an exemplary embodiment, the division result transmitted by the first communication node and obtained by dividing the uplink access signals by the first communication node may be received in at least one of the following manners. The division result is received via a broadcast channel of the first communication node. The division result is received via respective broadcast channels of one or more other first communication nodes in connection with a second communication node. The division result is received via high-layer signaling of one or more other first communication nodes in connection with a second communication node.

In an exemplary embodiment, the act of selecting the one or more uplink access signal groups according to the division result to transmit the uplink access signal to the first communication node in the uplink access beam form may include at least one of the following acts. The uplink access signal is transmitted to the first communication node according to a sequence transmitting order of the uplink access signal. The uplink access signal is transmitted to the first communication node according to a transmitting occasion of the uplink access signal. The uplink access signal is transmitted to the first communication node according to a transmitting frequency domain position of the uplink access signal.

In an exemplary embodiment, after the uplink access response message fed back by the first communication node according to the uplink access signal is received over the uplink access response resource corresponding to the selected uplink access signal group, the method may further include the following acts. It is judged, according to the uplink access response message, whether an uplink transmission signal meeting an uplink transmission requirement exists in the uplink access signal transmitted to the first communication node. When an uplink transmission signal meeting an uplink transmission requirement exists in the uplink access signal transmitted to the first communication node, transmission of the uplink access signal to the first communication node is stopped.

In an exemplary embodiment, the act of selecting the one or more uplink access signal groups according to the division result to transmit the uplink access signal to the first communication node in the uplink access beam form may include the following acts. At least one uplink access signal group is selected according to measured channel quality and a beam capability. The uplink access signal is transmitted to the first communication node by utilizing the selected uplink access signal group.

In an exemplary embodiment, the act of selecting the at least one uplink access signal group according to the measured channel quality may include the following acts. When the measured channel quality is higher than a first set threshold, an uplink access signal group containing uplink access signals of which the number is less than a third pre-determined number is selected. When the measured channel quality is lower than a second set threshold, an uplink access signal group containing uplink access signals of which the number is more than a fourth pre-determined number is selected.

In an exemplary embodiment, the number of the uplink access signals contained in the at least one uplink access signal group may be greater than or equal to the number of uplink access signals transmitted to the first communication node.

According to another embodiment of the present disclosure, a message transmitting device is provided, which may include a division module, a first receiving module, a determination module and a first transmitting module. The division module is arranged to divide uplink access signals into a first pre-determined number of uplink access signal groups, and the uplink access signal groups correspond to pre-determined uplink access response resources. The first receiving module is arranged to receive an uplink access signal, which is transmitted in an uplink access beam form based on one or more uplink access signal groups, from a second communication node, in the embodiment, the one or more uplink access signal groups are selected by the second communication node according to a division result. The determination module is arranged to determine an uplink access signal group to which the uplink access signal pertains, in the embodiment, one or more uplink access signals contained in the uplink access signal group are transmitted under at least one of the following restriction conditions: a restricted sequence transmitting order, a restricted transmitting occasion, and a restricted transmitting frequency domain position. The first transmitting module is arranged to transmit an uplink access response message to the second communication node over an uplink access response resource corresponding to the determined uplink access signal group.

In an exemplary embodiment, the division module may be arranged to: determine an uplink access signal group to which each uplink access signals pertain in a manner of informing, by the first communication node, the second communication node; and/or, determine an uplink access signal group to which each uplink access signals pertain in a manner of making an appointment between the first communication node and the second communication node.

In an exemplary embodiment, the division module may further include an informing unit, arranged to inform the second communication node in at least one of the following manners: informing the second communication node via a broadcast channel of the first communication node; informing, by one or more other first communication nodes in connection with the second communication node, the second communication node via respective broadcast channels of the one or more other first communication nodes; and informing, by one or more other first communication nodes in connection with the second communication node, the second communication node via high-layer signaling.

In an exemplary embodiment, the determination module may include a judgment unit and a first determination unit. The judgment unit is arranged to judge whether at least one of a transmitting occasion, a transmitting order or a transmitting frequency domain position of the uplink access signal has pre-determined correspondence with at least one of a transmitting occasion, a transmitting order or a transmitting frequency domain position of a pre-determined uplink access signal group. The first determination unit is arranged to determine, when a judgment result of the judgment unit is that the pre-determined correspondence exists, that the uplink access signal pertains to the pre-determined uplink access signal group.

In an exemplary embodiment, the first transmitting module may include a setting unit, a detection unit and a first transmitting unit. The setting unit is arranged to set a pre-determined number of detection threshold values, and the detection threshold values are used for representing quality of the uplink access signal. The detection unit is arranged to detect the received uplink access signal transmitted from the second communication node. The first transmitting unit is arranged to transmit, according to a detection result, a response message containing a detection threshold value corresponding to the detection result to the second communication node, or, transmit, when the number of the set detection threshold values is 1, a response message that does not contain the detection threshold value to the second communication node according to a detection result.

In an exemplary embodiment, the division module may include a first division unit and a second division unit. The first division unit is arranged to divide the uplink access signal groups into a second pre-determined number of grades. The second division unit is arranged to divide the uplink access signals into the first pre-determined number of uplink access signal groups according to the divided grades. In the exemplary embodiment, different numbers of uplink access signals are divided in uplink access signal groups under different grades; the same number of uplink access signals is divided in uplink access signal groups under an identical grade, or the difference of numbers of the uplink access signals divided in the uplink access signal groups under the identical grade is smaller than a pre-determined threshold number.

According to another embodiment of the present disclosure, a base station is provided, which may include the message transmitting device according to any one of the exemplary embodiments.

According to a further embodiment of the present disclosure, a message receiving device is provided, which may include a determination module, a second transmitting module and a second receiving module. The determination module is arranged to determine a division result of dividing uplink access signals into a first pre-determined number of uplink access signal groups, in the embodiment, the uplink access signal groups correspond to pre-determined uplink access response resources. The second transmitting module is arranged to select one or more uplink access signal groups according to the division result to transmit an uplink access signal to a first communication node in an uplink access beam form. In the embodiment, one or more uplink access signals contained in the selected uplink access signal group are transmitted under at least one of the following restriction conditions: a restricted sequence transmitting order, a restricted transmitting occasion, and a restricted transmitting frequency domain position. The second receiving module is arranged to receive an uplink access response message, which is fed back by the first communication node according to the uplink access signal, over an uplink access response resource corresponding to the selected uplink access signal group.

In an exemplary embodiment, the determination module may include at least one of a receiving unit and a second determination unit. The receiving unit is arranged to receive the division result transmitted by the first communication node and obtained by dividing the uplink access signals by the first communication node. The second determination unit is arranged to determine the division result in a manner of making an appointment with the first communication node.

In an exemplary embodiment, the receiving unit may be arranged to receive the division result transmitted by the first communication node and obtained by dividing the uplink access signals by the first communication node in at least one of the following manners: receiving the division result via a broadcast channel of the first communication node; receiving the division result via respective broadcast channels of one or more other first communication nodes in connection with a second communication node; and receiving the division result via high-layer signaling of one or more other first communication nodes in connection with a second communication node.

In an exemplary embodiment, the second transmitting module may be further arranged to transmit an uplink access signal to the first communication node in one of the following manners: transmitting the uplink access signal to the first communication node according to a sequence transmitting order of the uplink access signal; transmitting the uplink access signal to the first communication node according to a transmitting occasion of the uplink access signal; and transmitting the uplink access signal to the first communication node according to a transmitting frequency domain position of the uplink access signal.

In an exemplary embodiment, the message transmitting device may further include a judgment module and a stopping module. The judgment module is arranged to judge, according to the uplink access response message, whether an uplink transmission signal meeting an uplink transmission requirement exists in the uplink access signal transmitted to the first communication node. The stopping module is arranged to stop, when a judgment result of the second judgment module is that an uplink transmission signal meeting an uplink transmission requirement exists in the uplink access signal transmitted to the first communication node, transmitting the uplink access signal to the first communication node.

In an exemplary embodiment, the second transmitting module may include a selection unit and a second transmitting unit. The selection unit is arranged to select at least one uplink access signal group according to measured channel quality and a beam capability. The second transmitting unit is arranged to transmit the uplink access signal to the first communication node by utilizing the selected uplink access signal group.

In an exemplary embodiment, the selection unit may include a first selection sub-unit and a second selection sub-unit. The first selection sub-unit is arranged to select, when the measured channel quality is higher than a first set threshold, an uplink access signal group containing uplink access signals of which the number is less than a third pre-determined number. The second selection sub-unit is arranged to select, when the measured channel quality is lower than a second set threshold, an uplink access signal group containing uplink access signals of which the number is more than a fourth pre-determined number.

In an exemplary embodiment, the number of the uplink access signals contained in the at least one uplink access signal group may be greater than or equal to the number of uplink access signals transmitted to the first communication node.

According to a yet further aspect, a terminal is provided, which may include the message receiving device according to any one of the above exemplary embodiments.

According to the technical scheme of the embodiments of the present disclosure, the following acts are executed. Uplink access signals are divided into a first pre-determined number of uplink access signal groups, and the uplink access signal groups correspond to pre-determined uplink access response resources. An uplink access signal, which is transmitted in an uplink access beam form based on one or more uplink access signal groups, is received from a second communication node, and the one or more uplink access signal groups are selected by the second communication node according to a division result. An uplink access signal group to which the uplink access signal pertains is determined, where one or more uplink access signals contained in the uplink access signal group being transmitted under at least one of the following restriction conditions: a restricted sequence transmitting order, a restricted transmitting occasion, and a restricted transmitting frequency domain position. An uplink access response message is transmitted to the second communication node over an uplink access response resource corresponding to the determined uplink access signal group. The problem in the field of communications where a first communication node cannot respond to more uplink accesses is solved, thus achieving an effect that the first communication node may respond to more uplink accesses.

BRIEF DESCRIPTION OF THE DRAWINGS

The drawings illustrated herein are intended to provide a further understanding for the present disclosure, and form a part of the present application. In the drawings.

DETAILED DESCRIPTION OF THE EMBODIMENTS

The present disclosure will be illustrated hereinbelow with reference to the drawings and in conjunction with the embodiments in detail. It is important to note that the embodiments in the present application and the characteristics in the embodiments may be combined under the condition of no conflicts.

Figure 1A:
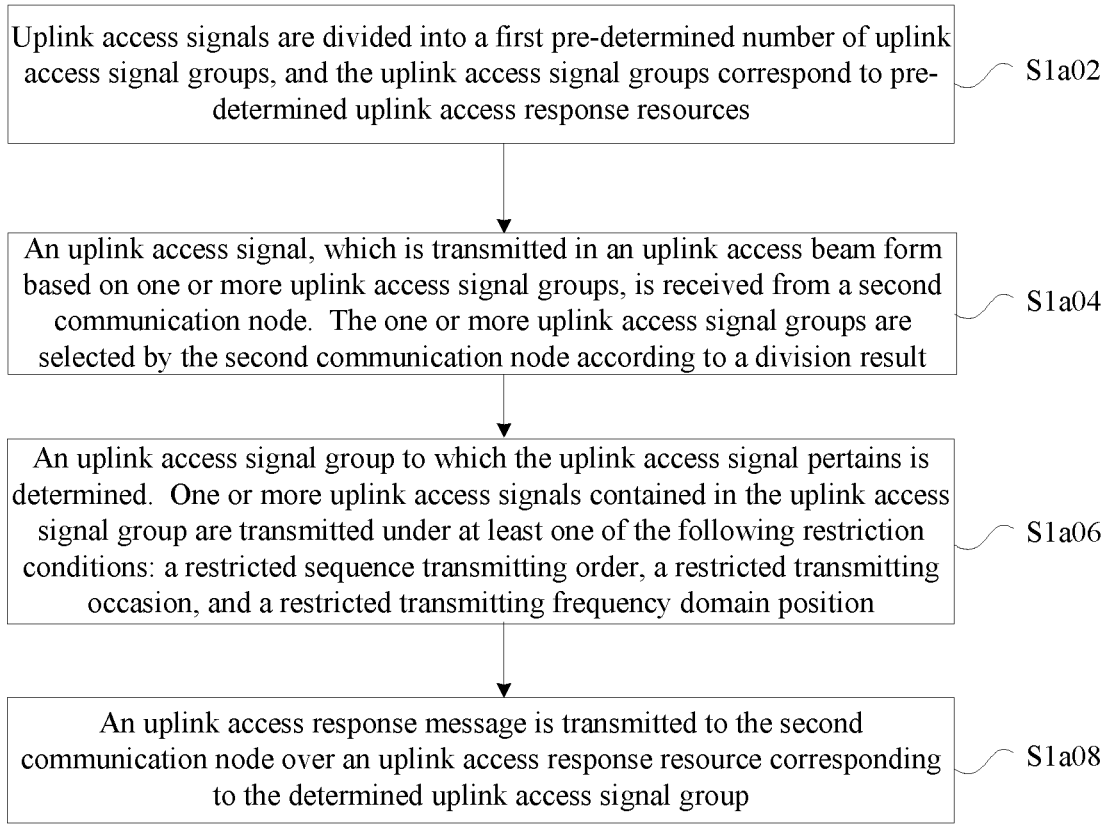
FIG. 1a is a flowchart of a message transmitting method according to an embodiment of the present disclosure.

In the present embodiment, a message transmitting method is provided. FIG. 1a is a flowchart of a message transmitting method according to an embodiment of the present disclosure. As shown in FIG. 1a, the flow includes the acts as follows.

At act S1a02, uplink access signals are divided into a first pre-determined number of uplink access signal groups, and the uplink access signal groups correspond to pre-determined uplink access response resources.

At act S1a04, an uplink access signal, which is transmitted in an uplink access beam form based on one or more uplink access signal groups, is received from a second communication node. The one or more uplink access signal groups are selected by the second communication node according to a division result.

At act S1a06, an uplink access signal group to which the uplink access signal pertains is determined. One or more uplink access signals contained in the uplink access signal group are transmitted under at least one of the following restriction conditions: a restricted sequence transmitting order, a restricted transmitting occasion, and a restricted transmitting frequency domain position.

At act S1a08, an uplink access response message is transmitted to the second communication node over an uplink access response resource corresponding to the determined uplink access signal group.

By means of the abovementioned acts, uplink access signals are divided into a first pre-determined number of uplink access signal groups, and the uplink access signal groups correspond to pre-determined uplink access response resources. An uplink access signal, which is transmitted in an uplink access beam form based on one or more uplink access signal groups, is received from a second communication node. The one or more uplink access signal groups are selected by a second communication node according to a division result. An uplink access signal group to which the uplink access signal pertains is determined, and one or more uplink access signals contained in the uplink access signal group are transmitted under at least one of the following restriction conditions: a restricted sequence transmitting order, a restricted transmitting occasion, and a restricted transmitting frequency domain position. An uplink access response message is transmitted to the second communication node over an uplink access response resource corresponding to the determined uplink access signal group. By virtue of the technical scheme, the uplink access signals can be received according to groups. Moreover, when it is determined that a plurality of received uplink access signals pertains to an identical uplink access signal group, a response message may be fed back over an uplink access response resource corresponding to the uplink access signal group, thus supporting more node accesses. The problem in the field of communications where a first communication node cannot respond to more uplink accesses is solved, thus achieving an effect that the first communication node may respond to more uplink accesses.

In an exemplary embodiment, dividing the uplink access signals into the first pre-determined number of uplink access signal groups may include at least one of the following acts. An uplink access signal group to which each uplink access signal pertains may be determined in a manner of informing, by the first communication node, the second communication node. An uplink access signal group to which each uplink access signal pertains may also be determined in a manner of making an appointment between the first communication node and the second communication node.

In an exemplary embodiment, informing, by the first communication node, the second communication node may include at least one of: informing the second communication node via a broadcast channel of the first communication node; informing, by one or more other first communication nodes in connection with the second communication node, the second communication node via respective broadcast channels of the one or more other first communication nodes; and informing, by one or more other first communication nodes in connection with the second communication node, the second communication node via high-layer signaling.

In an exemplary embodiment, determining an uplink access signal group to which the uplink access signal pertains may include the following acts. It is judged whether at least one of a transmitting occasion, a transmitting order or a transmitting frequency domain position of the uplink access signal has pre-determined correspondence with at least one of a transmitting occasion, a transmitting order or a transmitting frequency domain position of a pre-determined uplink access signal group. When the pre-determined correspondence exists, it is determined that the uplink access signal pertains to the pre-determined uplink access signal group.

In an exemplary embodiment, transmitting the uplink access response message to the second communication node may include the following acts. A pre-determined number of detection threshold values are set, and the detection threshold values are used for representing quality of the uplink access signal. The received uplink access signal transmitted from the second communication node is detected. A response message containing a detection threshold value corresponding to the detection result is transmitting to the second communication node according to a detection result; or, when the number of the set detection threshold values is 1, a response message that does not contain the detection threshold value is transmitted to the second communication node according to a detection result. That is, if the number of the set detection threshold values is 1, the detection threshold value may be carried or may be not carried when a response message is fed back to the second communication node. If the number of the set detection threshold values is greater than 1, the detection threshold value corresponding to the detection result may be carried when a response message is fed back to the second communication node.

In an exemplary embodiment, dividing the uplink access signals into the first pre-determined number of uplink access signal groups may include the following acts. The uplink access signal groups are divided into a second pre-determined number of grades. The uplink access signals are divided into the first pre-determined number of uplink access signal groups according to the divided grades. In the exemplary embodiment, different numbers of uplink access signals may be divided in uplink access signal groups under different grades; the same number of uplink access signals may be divided in uplink access signal groups under an identical grade, or the difference of numbers of the uplink access signals divided in the uplink access signal groups under the identical grade may be smaller than a pre-determined threshold number.

Figure 1B:
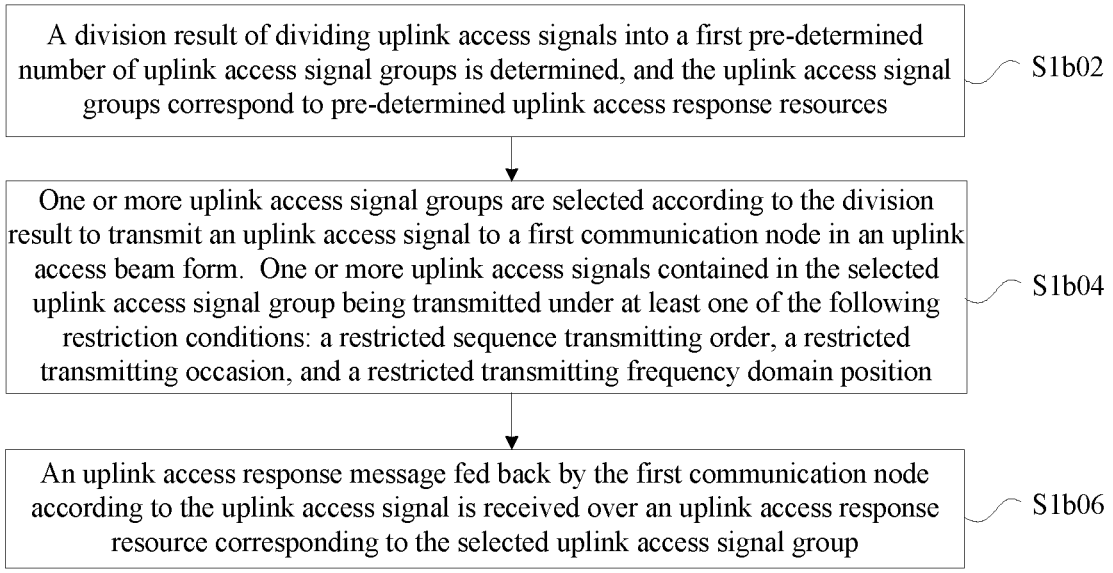
FIG. 1b is a flowchart of a message receiving method according to an embodiment of the present disclosure.

In another embodiment, a message receiving method is also provided. FIG. 1b is a flowchart of a message receiving method according to an embodiment of the present disclosure. As shown in FIG. 1b, the flow includes the acts as follows.

At act S1b02, a division result of dividing uplink access signals into a first pre-determined number of uplink access signal groups is determined. The uplink access signal groups correspond to pre-determined uplink access response resources.

At act S1b04, one or more uplink access signal groups are selected according to the division result to transmit an uplink access signal to a first communication node in an uplink access beam form. One or more uplink access signals contained in the selected uplink access signal group being transmitted under at least one of the following restriction conditions: a restricted sequence transmitting order, a restricted transmitting occasion, and a restricted transmitting frequency domain position.

At act S1b06, an uplink access response message fed back by the first communication node according to the uplink access signal is received over an uplink access response resource corresponding to the selected uplink access signal group.

By means of the abovementioned acts, the response message can be received over the uplink access response resource corresponding to the uplink access signal group to which the uplink access signal pertains, occupation of resources is reduced, and the aim of supporting more nodes to access the first communication node is achieved. The problem in the field of communications where the first communication node cannot respond to more uplink accesses is solved, thus achieving an effect that the first communication node may respond to more uplink accesses.

In an exemplary embodiment, determining the division result of dividing the uplink access signals into the first pre-determined number of uplink access signal groups may include at least one of the following acts. The division result transmitted by the first communication node and obtained by dividing the uplink access signals by the first communication node may be received. The division result may also be determined in a manner of making an appointment with the first communication node.

In an exemplary embodiment, the division result transmitted by the first communication node and obtained by dividing the uplink access signals by the first communication node may be received in at least one of the following manners. The division result may be received via a broadcast channel of the first communication node. The division result may be received via respective broadcast channels of one or more other first communication nodes in connection with a second communication node. The division result may be received via high-layer signaling of one or more other first communication nodes in connection with a second communication node.

In an exemplary embodiment, selecting one or more uplink access signal groups according to the division result to transmit an uplink access signal to the first communication node in an uplink access beam form may include at least one of: transmitting the uplink access signal to the first communication node according to a sequence transmitting order of the uplink access signal; transmitting the uplink access signal to the first communication node according to a transmitting occasion of the uplink access signal; and transmitting the uplink access signal to the first communication node according to a transmitting frequency domain position of the uplink access signal.

In an exemplary embodiment, after the uplink access response message fed back by the first communication node according to the uplink access signal is received over the uplink access response resource corresponding to the selected uplink access signal group, the method may further include the following acts. Whether an uplink transmission signal meeting an uplink transmission requirement exists in the uplink access signal transmitted to the first communication node is judged according to the uplink access response message. When an uplink transmission signal meeting an uplink transmission requirement exists in the uplink access signal transmitted to the first communication node, transmission of the uplink access signal to the first communication node is stopped.

In an exemplary embodiment, selecting one or more uplink access signal groups according to the division result to transmit an uplink access signal to the first communication node in an uplink access beam form may include the following acts. At least one uplink access signal group is selected according to measured channel quality and a beam capability. The uplink access signal is transmitted to the first communication node by utilizing the selected uplink access signal group.

In an exemplary embodiment, selecting at least one uplink access signal group according to measured channel quality may include the following acts. When the measured channel quality is higher than a first set threshold, an uplink access signal group containing uplink access signals of which the number is less than a third pre-determined number is selected. When the measured channel quality is lower than a second set threshold, an uplink access signal group containing uplink access signals of which the number is more than a fourth pre-determined number is selected.

In the embodiment, the number of the uplink access signals contained in the at least one uplink access signal group is greater than or equal to the number of uplink access signals transmitted to the first communication node. Thus, at least one uplink access signal group that is selected can cover all uplink transmitting beams.

In another embodiment, a message transmitting device and a message receiving device are also provided. The devices are arranged to implement the abovementioned embodiments and exemplary implementation modes. Those which have been illustrated will not be elaborated herein. Just as a term 'module' used below, the combination of software and/or hardware with predetermined functions may be implemented. Although the devices described by the following embodiments are better implemented by software, the implementation of hardware or the combination of software and hardware may be possible and conceived.

Figure 2:
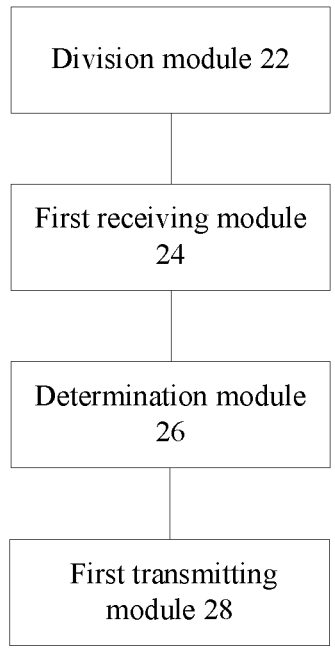
FIG. 2 is a block diagram of a message transmitting device according to an embodiment of the present disclosure.

FIG. 2 is a block diagram of a message transmitting device according to an embodiment of the present disclosure. As shown in FIG. 2, the device includes a division module 22, a first receiving module 24, a determination module 26 and a first transmitting module 28. The device will be illustrated hereinbelow.

The division module 22 is arranged to divide uplink access signals into a first pre-determined number of uplink access signal groups, and the uplink access signal groups correspond to pre-determined uplink access response resources. The first receiving module 24 is coupled to the division module 22 and is arranged to receive an uplink access signal, which is transmitted in an uplink access beam form based on one or more uplink access signal groups, from a second communication node, in the embodiment, the one or more uplink access signal groups are selected by the second communication node according to a division result. The determination module 26 is coupled to the first receiving module 24 and is arranged to determine an uplink access signal group to which the uplink access signal pertains. In the embodiment, one or more uplink access signals contained in the uplink access signal group being transmitted under at least one of the following restriction conditions: a restricted sequence transmitting order, a restricted transmitting occasion, and a restricted transmitting frequency domain position. The first transmitting module 28 is coupled to the determination module 26 and is arranged to transmit an uplink access response message to the second communication node over an uplink access response resource corresponding to the determined uplink access signal group.

In the embodiment, the division module is arranged to: determine an uplink access signal group to which each uplink access signals pertain in a manner of informing, by the first communication node, the second communication node; and/or, determine an uplink access signal group to which each uplink access signals pertain in a manner of making an appointment between the first communication node and the second communication node.

Figure 3:
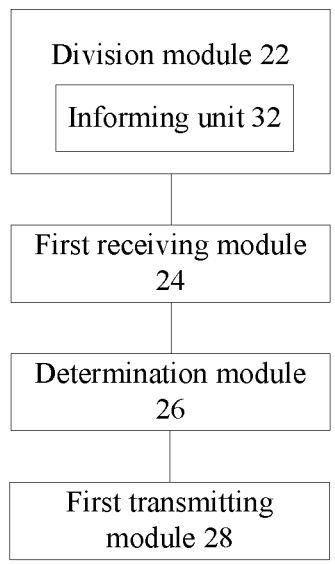
FIG. 3 is a block diagram 1 of a division module 22 in a message transmitting device according to an embodiment of the present disclosure.

FIG. 3 is a block diagram 1 of a division module 22 in a message transmitting device according to an embodiment of the present disclosure. As shown in FIG. 3, the division module 22 includes an informing unit 32. The informing unit 32 will be illustrated hereinbelow.

The informing unit 32 is arranged to inform the second communication node in at least one of the following manners: informing the second communication node via a broadcast channel of the first communication node; informing, by one or more other first communication nodes in connection with the second communication node, the second communication node via respective broadcast channels of the one or more other first communication nodes; and informing, by one or more other first communication nodes in connection with the second communication node, the second communication node via high-layer signaling.

Figure 4:
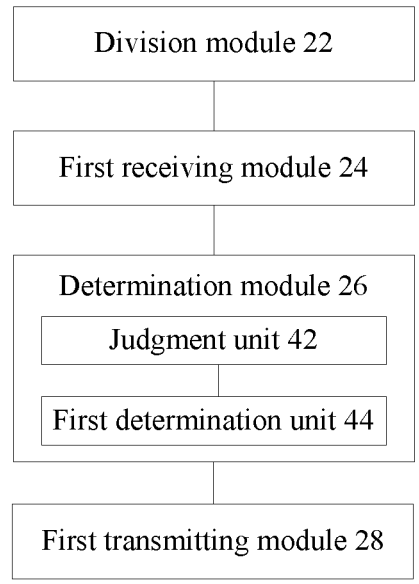
FIG. 4 is a block diagram of a determination module 26 in a message transmitting device according to an embodiment of the present disclosure.

FIG. 4 is a block diagram of a determination module 26 in a message transmitting device according to an embodiment of the present disclosure. As shown in FIG. 4, the determination module 26 includes a judgment unit 42 and a first determination unit 44. The determination module 26 will be illustrated hereinbelow.

The judgment unit 42 is arranged to judge whether at least one of a transmitting occasion, a transmitting order or a transmitting frequency domain position of the uplink access signal has pre-determined correspondence with at least one of a transmitting occasion, a transmitting order or a transmitting frequency domain position of a pre-determined uplink access signal group. The first determination unit 44 is coupled to the judgment unit 42 and is arranged to determine, when a judgment result of the judgment unit is that the pre-determined correspondence exists, that the uplink access signal pertains to the pre-determined uplink access signal group.

Figure 5:
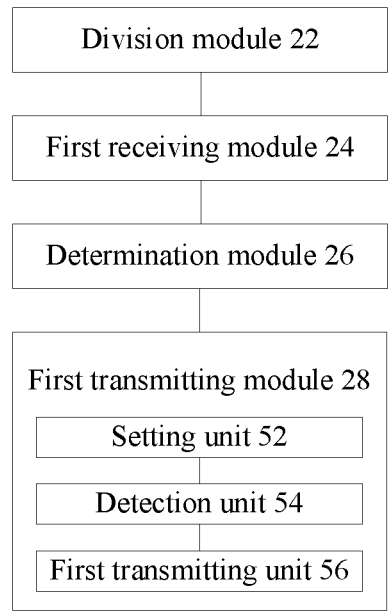
FIG. 5 is a block diagram of a first transmitting module 28 in a message transmitting device according to an embodiment of the present disclosure.

FIG. 5 is a block diagram of a first transmitting module 28 in a message transmitting device according to an embodiment of the present disclosure. As shown in FIG. 5, the first transmitting module 28 includes a setting unit 52, a detection unit 54 and a first transmitting unit 56. The first transmitting module 28 will be illustrated hereinbelow.

The setting unit 52 is arranged to set a pre-determined number of detection threshold values, and the detection threshold values are used for representing quality of the uplink access signal. The detection unit 54 is coupled to the setting unit 52 and is arranged to detect the received uplink access signal transmitted from the second communication node. The first transmitting unit 56 is coupled to the detection unit 54 and is arranged to transmit, according to a detection result, a response message containing a detection threshold value corresponding to the detection result to the second communication node, or, transmit, when the number of the set detection threshold values is 1, a response message that does not contain the detection threshold value to the second communication node according to a detection result.

Figure 6:
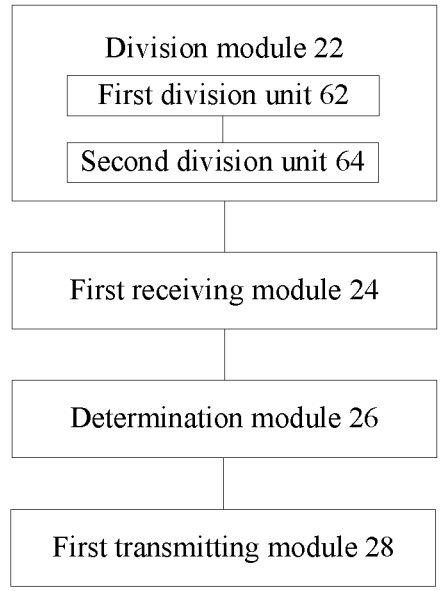
FIG. 6 is a block diagram 2 of a division module 22 in a message transmitting device according to an embodiment of the present disclosure.

FIG. 6 is a block diagram 2 of a division module 22 in a message transmitting device according to an embodiment of the present disclosure. As shown in FIG. 6, the division module 22 includes a first division unit 62 and a second division unit 64. The division module 22 will be illustrated hereinbelow.

The first division unit 62 is arranged to divide the uplink access signal groups into a second pre-determined number of grades. The second division unit 64 is coupled to the first division unit 62 and is arranged to divide the uplink access signals into the first pre-determined number of uplink access signal groups according to the divided grades. In the embodiment, different numbers of uplink access signals are divided in uplink access signal groups under different grades; the same number of uplink access signals is divided in uplink access signal groups under an identical grade, or the difference of numbers of the uplink access signals divided in the uplink access signal groups under the identical grade is smaller than a pre-determined threshold number.

Figure 7:
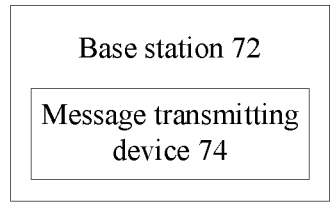
FIG. 7 is a block diagram of a base station according to an embodiment of the present disclosure.

FIG. 7 is a block diagram of a base station according to an embodiment of the present disclosure. As shown in FIG. 7, the base station 72 includes the message transmitting device 74 according to any one of the foregoing exemplary embodiments.

Figure 8:
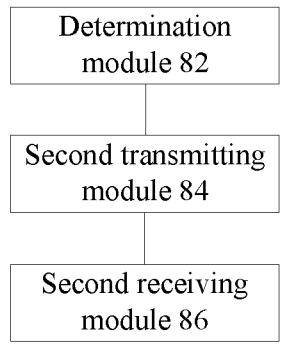
FIG. 8 is a block diagram of a message receiving device according to an embodiment of the present disclosure.

FIG. 8 is a block diagram of a message receiving device according to an embodiment of the present disclosure. As shown in FIG. 8, the message receiving device includes a determination module 82, a second transmitting module 84 and a second receiving module 86. The device will be continuously illustrated hereinbelow.

The determination module 82 is arranged to determine a division result of dividing uplink access signals into a first pre-determined number of uplink access signal groups, in the embodiment, the uplink access signal groups correspond to pre-determined uplink access response resources. The second transmitting module 84 is coupled to the determination module 82 and is arranged to select one or more uplink access signal groups according to the division result to transmit an uplink access signal to a first communication node in an uplink access beam form. One or more uplink access signals contained in the selected uplink access signal group being transmitted under at least one of the following restriction conditions: a restricted sequence transmitting order, a restricted transmitting occasion, and a restricted transmitting frequency domain position. The second receiving module 86 is coupled to the second transmitting module 84 and is arranged to receive an uplink access response message, which is fed back by the first communication node according to the uplink access signal, over an uplink access response resource corresponding to the selected uplink access signal group.

Figure 9:
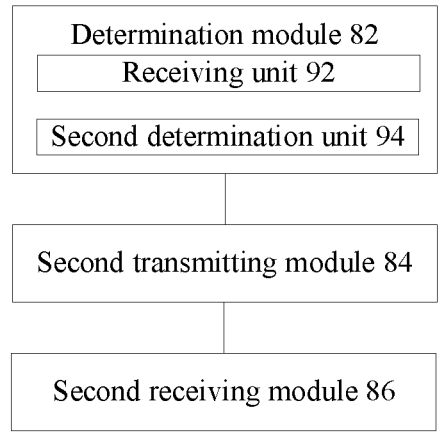
FIG. 9 is a block diagram of a determination module 82 in a message receiving device according to an embodiment of the present disclosure.

FIG. 9 is a block diagram of a determination module 82 in a message receiving device according to an embodiment of the present disclosure. As shown in FIG. 9, the determination module 82 includes a receiving unit 92 and/or a second determination unit 94. The determination module 82 will be illustrated hereinbelow.

The receiving unit 92 is arranged to receive the division result transmitted by the first communication node and obtained by dividing the uplink access signals by the first communication node. The second determination unit 94 is arranged to determine the division result in a manner of making an appointment with the first communication node.

In the embodiment, the receiving unit 92 is arranged to receive the division result transmitted by the first communication node and obtained by dividing the uplink access signals by the first communication node in at least one of the following manners: receiving the division result via a broadcast channel of the first communication node; receiving the division result via respective broadcast channels of one or more other first communication nodes in connection with a second communication node; and receiving the division result via high-layer signaling of one or more other first communication nodes in connection with a second communication node.

In the embodiment, the second transmitting module 84 is further arranged to transmit an uplink access signal to the first communication node in one of the following manners: transmitting the uplink access signal to the first communication node according to a sequence transmitting order of the uplink access signal; transmitting the uplink access signal to the first communication node according to a transmitting occasion of the uplink access signal; and transmitting the uplink access signal to the first communication node according to a transmitting frequency domain position of the uplink access signal.

Figure 10:
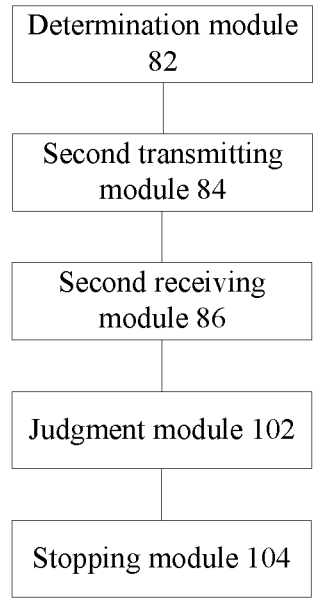
FIG. 10 is an exemplary block diagram of a message receiving device according to an embodiment of the present disclosure.

FIG. 10 is an exemplary block diagram of a message receiving device according to an embodiment of the present disclosure. As shown in FIG. 10, the device further includes, in addition to all modules shown in FIG. 8, a judgment module 102 and a stopping module 104. The device will be illustrated hereinbelow.

The judgment module 102 is coupled to the second receiving module 86 and is arranged to judge, according to the uplink access response message, whether an uplink transmission signal meeting an uplink transmission requirement exists in the uplink access signal transmitted to the first communication node. The stopping module 104 is coupled to the judgment module 102 and is arranged to stop, when a judgment result of the second judgment module 102 is that the uplink transmission signal meeting the uplink transmission requirement exists in the uplink access signal transmitted to the first communication node, transmitting the uplink access signal to the first communication node.

Figure 11:
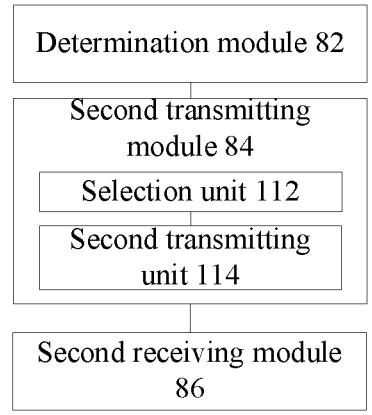
FIG. 11 is a block diagram of a second transmitting module 84 in a message receiving device according to an embodiment of the present disclosure.

FIG. 11 is a block diagram of a second transmitting module 84 in a message receiving device according to an embodiment of the present disclosure. As shown in FIG. 11, the second transmitting module 84 includes a selection unit 112 and a second transmitting unit 114. The second transmitting module 84 will be illustrated hereinbelow.

The selection unit 112 is arranged to select at least one uplink access signal group according to measured channel quality and a beam capability. The second transmitting unit 114 is coupled to the selection unit 112 and is arranged to transmit the uplink access signal to the first communication node by utilizing the selected uplink access signal group.

Figure 12:
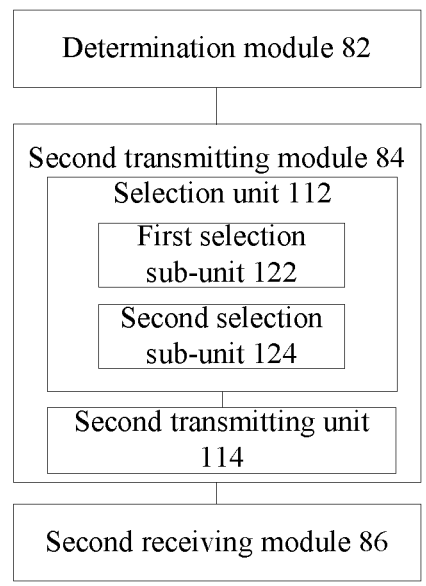
FIG. 12 is a block diagram of a selection unit 112 in a message receiving device according to an embodiment of the present disclosure.

FIG. 12 is a block diagram of a selection unit 112 in a message receiving device according to an embodiment of the present disclosure. As shown in FIG. 12, the selection unit 112 includes a first selection sub-unit 122 and a second selection sub-unit 124. The selection unit 112 will be illustrated hereinbelow.

The first selection sub-unit 122 is arranged to select, when the measured channel quality is higher than a first set threshold, an uplink access signal group containing uplink access signals of which the number is less than a third pre-determined number. The second selection sub-unit 124 is arranged to select, when the measured channel quality is lower than a second set threshold, an uplink access signal group containing uplink access signals of which the number is more than a fourth pre-determined number.

In the embodiment, the number of the uplink access signals contained in the at least one uplink access signal group selected by the selection unit 112 is greater than or equal to the number of uplink access signals transmitted to the first communication node.

Figure 13:
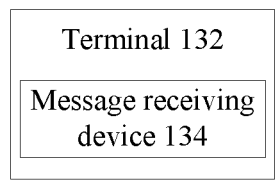
FIG. 13 is a block diagram of a terminal according to an embodiment of the present disclosure.

FIG. 13 is a block diagram of a terminal according to an embodiment of the present disclosure. As shown in FIG. 13, the terminal 132 includes the message receiving device 134 according to any one of the foregoing exemplary embodiments.

In the field of communications, when a second communication node needs to access a first communication node, more uplink access signals may be transmitted to the first communication node. More antenna elements mean that coverage of high-frequency communication may be guaranteed in a beam forming manner, while narrower beams require a transceiver to perform more accurate beam alignment. From the previous design idea of LTE, it may be seen that it may be needed to accurately obtain channel state information to obtain a good beam forming effect, so as to obtain a beam forming weight from the channel state information. To obtain a better beam forming weight, the second communication node serving as a receiver needs to feed downlink channel state information or weight back to the first communication node serving as a transmitter. The transmitter needs to feed the downlink channel state information or weight back to the receiver, so as to ensure that the first communication node may transmit downlink services by using an optimal beam while the second communication node may also transmit uplink services by using the optimal beam. At this time, there may be such a problem: before obtaining the weight, the first communication node cannot cover the receiver by using the optimal beam, so that the receiver cannot measure a reference signal transmitted by the first communication node; or even if the first communication node covers the second communication node, the second communication node cannot achieve the same coverage of the first communication node, and the first communication node cannot learn of fed contents, so that selection of a beam weight and normal communication cannot be performed. Moreover, if the second communication node has a multi-beam transmitting capability, the first communication node cannot identify whether these uplink accesses come from an identical communication node, which will increase an access process overhead, resulting in that the first communication node cannot respond to more uplink accesses. For the abovementioned problem, an uplink access and beam confirmation method associated with access equipment is also provided in the embodiments of the present disclosure, and will be illustrated hereinbelow.

In practical application, a discovery process may be applied, with which the first communication node and the second communication node can discover the opposite party to perform initial data transmission, so as to perform subsequent data transmission and/or further beam adjustment.

The first communication node may pre-broadcast resources corresponding to a plurality of uplink access signal groups and uplink access response resources corresponding to the plurality of uplink access signal groups, or the resources corresponding to the plurality of uplink access signal groups and the corresponding uplink access response resources may be determined in a manner of making an appointment between the first communication node and the second communication node.

The second communication node knows resource information of these uplink access signals, judges the number of beams for uplink access according to a measured channel situation and an own antenna capability, and selects an uplink access signal group i approximate to the number of uplink transmitting beams from the uplink access signal groups. If the second communication node is capable of transmitting multiple beams simultaneously, the second communication node selects a plurality of uplink access signal groups in an uplink access process to perform uplink synchronization and beam confirmation, and at this time, the number of uplink access signals of all groups should be identical or approximate to the number of uplink transmitting beams for uplink access.

The second communication node transmits uplink access signals of group i in a beam forming manner, and transmits a sequence transmitting order of the uplink access signals, a transmitting occasion and a frequency domain resource according to a rule informed by the first communication node or a rule appointed between nodes. The first communication node informing an uplink access signal group and corresponding resource configuration information of an uplink access response may be a node performing synchronization and beam determination with the second communication node such as a millimeter wave node, or a node having been connected with the second communication node such as traditional Global system for Mobile Communication (GSM), (TD/W) Code Division Multiple Access (CDMA), and LTE stations.

Different uplink access signal groups are distinguished in a predefined or informing manner according to at least one of the following.

Different uplink access signal groups are distinguished by means of at least one of three dimensions, namely time domain, frequency domain and code domain dimensions of an uplink access signal group.

Distinguishing of the time domain dimension is conducted based on a transmitting occasion of an uplink access signal and/or duration of an uplink access signal.

The second communication node learns of configurations about uplink access signal groups of the first communication node to select an uplink access signal group i according to channel quality measurement and an own beam transmitting capability, and the second communication selects groups of which the number is approximate to the number of own beams to transmit uplink access signals. For example, the number of transmitting beams of the second communication node is nTxBeam, the number of uplink access signals of group i is Xi, and in an exemplary embodiment, it should be satisfied that nTxBeam<Xi to ensure coverage of all uplink transmitting beams of the second communication node.

If the second communication node has a multi-beam uplink transmitting capability, the second communication node may select a plurality of uplink access signal groups to execute an uplink access and beam confirmation process. It is ensured that the total number of uplink access signals of each group is greater than or equal to the total number of uplink transmitting beams.

The second communication node transmits the uplink access signals according to the selected uplink access signal group i, and transmission of the uplink access signals follows a restricting rule of the uplink access signal group i, specifically including the following restricting rule.

The upper limit of the number of the uplink access signals transmitted by the second communication node in an uplink access process is Xi, the uplink access process herein refers to a process of selecting, by the second communication node, group i to transmit an uplink access signal and receive an uplink access response without power ascent. If the uplink access response is not received after the second communication node transmits all uplink access signals of group i completely, the situation of performing power ascent to repeatedly transmit the uplink access signal is not limited by the upper limit of Xi.

The second communication node needs to follow a restriction condition of the first communication node about the uplink access signal group i in an uplink access process, specifically including the following restricting rule.

Uplink access signals of group i are transmitted at a specified starting time, the starting time is relative to the first communication node. A propagation delay exists and a delay exists between the uplink access signal and a receiving time of the first communication node, the following two situations may be taken into consideration.

The capacity may be improved by using a high-frequency high-bandwidth carrier in a hot-spot area. Under this circumstance, the radius of a cell is small generally, the influence of a delay on receiving of an uplink synchronization signal via the first communication node may be omitted, and the second communication node transmits an uplink access signal regularly according to receiving data.

If the coverage radius of the first communication node is large, the detection performance of the first communication node may be influenced or a subsequent frame may be interfered in the absence of adjustment of a transmitting time, so it may be needed to adjust the transmitting time. Specifically, a substantial distance between the second communication node and the first communication node is calculated according to a downlink signal estimation path loss, and the second communication node adjusts a lead of transmitting of the uplink access signal.

The second communication node transmits uplink access signals of group i at a specified frequency domain position. The frequency domain position herein includes a starting position of a frequency domain and a bandwidth occupied by the frequency domain, and different frequency domain positions and different frequency domain bandwidths can be used for distinguishing different uplink access signal groups.

The second communication node transmits the uplink access signals according to a sequence order specified by group i, the first communication node may judge uplink access starting and ending positions of group i, and under this circumstance, the first communication node does not need to restrict a strict uplink access starting time.

The first communication node receives an uplink access signal over a resource corresponding to each uplink access signal group, and the first communication node judges a group to which the received uplink access signal pertains according to a relationship among a time domain, a frequency domain and a sequence order of the uplink access signal. The first communication node detects the uplink access signal of this group at a subsequent resource position.

After receiving the uplink access signal of group i, the first communication node transmits an uplink access response message over an uplink access response resource corresponding to group i, where there may be one or more resources occupied by the uplink access response message corresponding to group i informed by the first communication node. If uplink access responses of group i configure a plurality of resources, the first communication node may discard one or more of the uplink access responses according to a scheduling policy. At this time, the uplink access responses should not strictly correspond to the uplink access signals, and meanwhile, the second communication node is also required to receive all resource positions of the uplink access responses corresponding to group i before recognizing that uplink transmission is satisfied.

When the first communication node transmits the uplink access response message of group i, one or more thresholds may be set, and the degree of matching between a signal and a specific threshold is judged. It is determined whether uplink access quality indication information is carried in the uplink access response message according to the number of detection thresholds.

When receiving one or more uplink access response messages, the second communication node judges whether to transmit a subsequent uplink access signal. If the second communication node may determine a transmitting beam satisfying the uplink transmission according to the received uplink access response messages, transmission of a subsequent uplink access signal is stopped to reduce access delays and overheads. Otherwise, the second communication node continues transmitting the subsequent uplink access signal of group i. If a transmitting beam satisfying the uplink transmission has not been determined yet after the uplink access signals of group i are completely transmitted, an uplink access signal group may be reselected, or the uplink access signals are still transmitted by using group i after power ascent.

In practical system application, the concept of the beam refers to that the beam may reduce leakage of signal power of the first communication node in a useless direction, thereby ensuring the direction characteristic of the signal power, and enhancing the coverage range of the first communication node.

The uplink access signal groups are used for distinguishing different second communication nodes in an access process, and the second communication node selects the uplink access signal group i to transmit the uplink access signals. The second communication node transmits the uplink access signals in an uplink beam forming manner, and the first communication node implicitly informs an uplink transmitting beam used for uplink access by means of the uplink access response. The second communication node judges that the uplink beam satisfying the uplink transmission is used for subsequent uplink data transmitting. Uplink access feedback of the first communication node may be relevant information of an index such as a time domain resource set index, a frequency domain resource set index, a signal sequence index, or values equivalent to these indexes. Any indexes capable of expressing relevancy or equivalency to a downlink beam index in the present disclosure fall within the scope of protection of the present disclosure.

The present disclosure will be illustrated hereinbelow in conjunction with specific embodiments.

Embodiment 1

The present embodiment is illustrated with a base station serving as a first communication node and a terminal serving as a second communication node. The base station and the terminal predefine N time domain resource sets to correspond to N uplink access signal groups. Time starting positions of the uplink access signal groups are determined by the base station.

Or, the base station informs correspondence between the N time domain resource sets and the N uplink access signal groups by means of broadcasts and/or high-layer signaling. The base station may be a base station being subjected to synchronization and beam confirmation with the terminal, or may be other base stations having been connected with the terminal.

If the terminal obtains the correspondence between the N time domain resource sets and the N uplink access signal groups by means of broadcasts and/or high-layer signaling, the terminal needs to receive the broadcasts and/or the high-layer signaling first to obtain the correspondence.

Figure 14A:
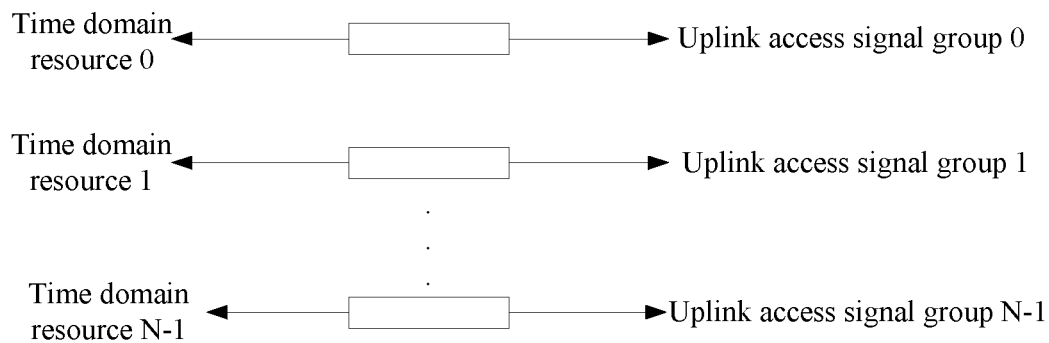
FIG. 14a is a schematic diagram of a principle for restricting an uplink access by utilizing a time domain resource set according to an embodiment of the present disclosure.
Figure 14B:
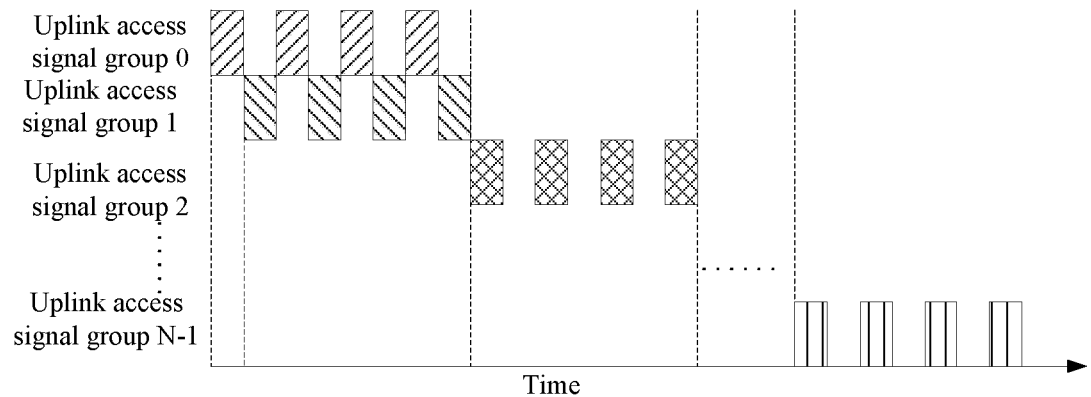
FIG. 14b is a schematic diagram of a mode for distinguishing uplink access signal groups in a time domain according to Embodiment 1 of the present disclosure.
Figure 14C:
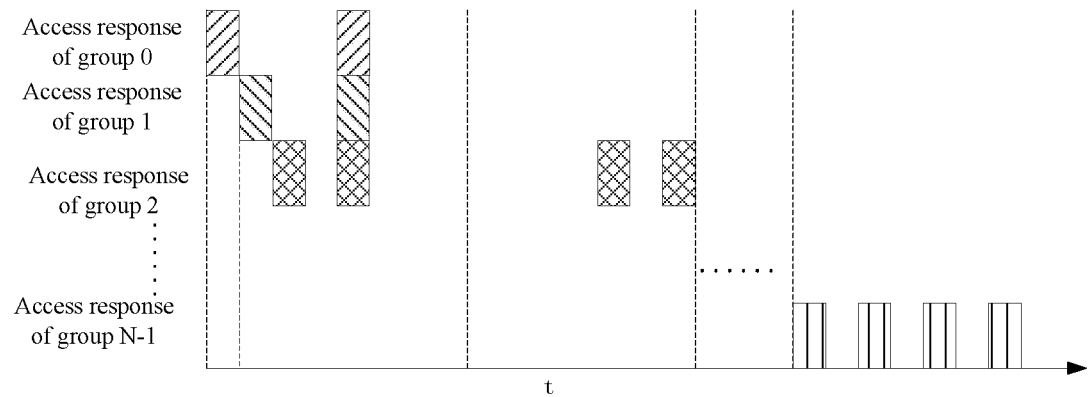
FIG. 14c is a schematic diagram of a time resource for an uplink access response according to Embodiment 1 of the present disclosure.

After the terminal obtains the correspondence between the N time domain resource sets and the N uplink access signal groups, the terminal selects an uplink access signal group i according to measured channel quality and an own beam capability, where the number of uplink access signals of group i is approximate to the number $X_i$ of uplink transmitting beams of the terminal. Different uplink access signals of group i are distinguished over corresponding time domain resources. The base station receives uplink access signals over time resources corresponding to different uplink access signal groups, and identifies the uplink access signal group i corresponding to the uplink access signals. The base station determines potential positions of subsequent uplink access signals of group i according to a group corresponding to the received uplink access signals, and receives the uplink access signals of group i at these resource positions. FIG. 14a is a schematic diagram of a principle for restricting an uplink access by utilizing a time domain resource set according to an embodiment of the present disclosure. FIG. 14b is a schematic diagram of a mode for distinguishing uplink access signal groups in a time domain according to Embodiment 1 of the present disclosure. FIG. 14c is a schematic diagram of a time resource for an uplink access response according to Embodiment 1 of the present disclosure. In the embodiment, the number of uplink access response resources of different groups may be different, and resource positions of uplink access responses may be overlapped or even resources of uplink access responses of some or all groups may be partially or completely identical. In the embodiment, a time domain resource set may include a plurality of time unit sets. Time units may be micro-frames, sub-frames, half-frames, radio frames, basic time units or the like.

The base station divides the uplink access into one or more detection thresholds, and after receiving the uplink access signals of group i, the base station determines whether to delay for transmitting the uplink access responses according to the number of resources of uplink access responses of group i, the number of the detection thresholds divided by the base station, and own scheduling resources.

After receiving an answer message, the terminal judges whether a transmitting beam satisfying uplink transmission can be identified. If the transmitting beam satisfying the uplink transmission can be identified, transmitting of subsequent uplink access signals is ended; and otherwise, the subsequent uplink access signals are continuously transmitted.

Sub-Embodiment 1

It is supposed that a base station is configured with 16 uplink access signal groups for uplink access of a terminal. Each uplink access signal group corresponds to at least one uplink access signal. The base station informs the terminal of correspondence between 16 time domain resource sets and the 16 uplink access signal groups by means of broadcasts and/or high-layer signaling, as shown in Table 1. In the embodiment, the time domain resource sets may include occupied time unit indexes and/or duration, where the duration may be presented by the number of the included time units, and the duration may be a time domain repeat count of uplink access signals.

TABLE 1

| Uplink access signal group index | Time domain resource set for transmitting uplink access signal |
|---|---|
| 0 | Time domain resource set 0 |
| 1 | Time domain resource set 1 |
| ... | ... |
| 15 | Time domain resource set 15 |

The base station may set four detection threshold grades marked as th0-th3 respectively, where th3 is an optimal threshold, and th0 is a minimum threshold.

The terminal receives a base station broadcast message by detecting a downlink signal to identify resource set information of an uplink access signal group. It is supposed that the terminal may basically cover, by utilizing four uplink transmitting beams, an uplink transmitting area needing to be covered by the terminal, and the terminal selects group 0 having four access signals to transmit uplink access signals over appointed time resources in a beam forming manner.

The base station receives the uplink access signals of group 0, transmitted by the terminal, and compares with the four detection thresholds set by the base station. The base station regards that this detection satisfies the optimal threshold th3, and the base station selects a closest resource from uplink access response time resources to transmit an uplink access response.

The terminal performs uplink detection on uplink access response signals over time resources corresponding to the uplink access response of group 0, the terminal detects the uplink access response of group 0, fed back by the base station, and the terminal may judge that the uplink transmission is satisfied according to the detection threshold th3 corresponding to the uplink access response. The terminal ends transmitting subsequent uplink access signals, and performs subsequent access flow and data transmission.

Sub-Embodiment 2

It is supposed that a base station is configured with eight uplink access signal groups for uplink access of different terminals. Each uplink access signal group corresponds to at least one uplink access signal. The base station and the terminals make an appointment about correspondence between eight time domain resource sets and the eight uplink access signal groups, as shown in Table 2. In the embodiment, the time domain resource sets may include occupied time unit indexes and/or duration, where the duration may be presented by the number of the included time units, and the duration may be a time domain repeat count of uplink access signals.

TABLE 2

| Uplink access signal group index | Time domain resource set for transmitting uplink access signal |
|---|---|
| 0 | Time domain resource set 0 |
| 1 | Time domain resource set 1 |
| ... | ... |
| 7 | Time domain resource set 7 |

The base station may set four detection threshold grades marked as th0-th3 respectively, where th3 is an optimal threshold, and th0 is a minimum threshold.

It is supposed that there are four uplink transmitting beams of the terminals, which may basically cover uplink transmitting areas needing to be covered by the terminals. The terminals select group 2 having four access signals to transmit uplink access signals over appointed time resources in a beam forming manner.

The base station receives uplink access signals of group 2, transmitted by the terminals, the uplink access signals of group 2 corresponding to four uplink access response resources. Four uplink access detection values detected by the base station satisfy threshold values th0, th0, th1 and th2 respectively. The base station transmits uplink access responses of uplink transmitting beams corresponding to th2 over the last time resource in uplink access response time resources.

The terminals perform uplink detection on uplink access response signals over each time resource corresponding to the uplink access response of group 2, the terminals detect the uplink access response of group 2, fed back by the base station, at the last time resource position of the uplink access response, and the terminals may judge that a beam satisfying the uplink transmission is an uplink transmitting beam corresponding to th2 according to the uplink access response transmitted by the base station, and subsequent access flow and data transmission are continued.

Sub-Embodiment 3

It is supposed that a base station is configured with eight uplink access signal groups for uplink access of different terminals. Each uplink access signal group corresponds to at least one uplink access signal. The base station and the terminals make an appointment about correspondence between eight time domain resource sets and the eight uplink access signal groups, as shown in Table 2. In the embodiment, the time domain resource sets may include occupied time unit indexes and/or duration, where the duration may be presented by the number of the included time units, and the duration may be a time domain repeat count of uplink access signals.

The base station may set four detection threshold grades marked as th0-th3 respectively, where th3 is an optimal threshold, and th0 is a minimum threshold.

It is supposed that there are four uplink transmitting beams of terminal 1 and there are two uplink transmitting beams of terminal 2. The two terminals select group 2 having four access signals to transmit uplink access signals over appointed time resources in a beam forming manner. In the sub-embodiment, terminal 1 transmits the uplink access signals from time 1 to time 4, and terminal 2 transmits the uplink access signals only at time 1 and time 2.

The base station receives the uplink access signals of group 2, transmitted by terminal 1 and terminal 2, the uplink access signals of group 2 corresponding to four uplink access response resources. Four uplink access detection values detected by the base station satisfy threshold values th0, th0, th1 and th2 respectively. The base station transmits an uplink access signal of an uplink transmitting beam corresponding to th2 in the last uplink access response time resource. Since terminal 2 does not transmit uplink access signals at time 3 and time 4, terminal 2 may judge that the response is not given to terminal 2. Though the two terminals use a group of uplink accesses simultaneously, access conflicts may be avoided to a certain extent.

Terminal 1 identifies the uplink transmitting beam corresponding to the uplink access signal response, and terminal 1 selects the uplink transmitting beam satisfying uplink transmission to perform subsequent access flow and data transmission.

Embodiment 2

A base station and a terminal predefine N frequency domain resource sets to correspond to N uplink access signal groups. Different uplink access signal groups are determined by means of frequency domain positions.

Or, the base station informs correspondence between the N frequency domain resource sets and the N uplink access signal groups by means of broadcasts and/or high-layer signaling. The base station may be a base station being subjected to synchronization and beam confirmation with the terminal, or may be other base stations having been connected with the terminal.

Figure 15A:
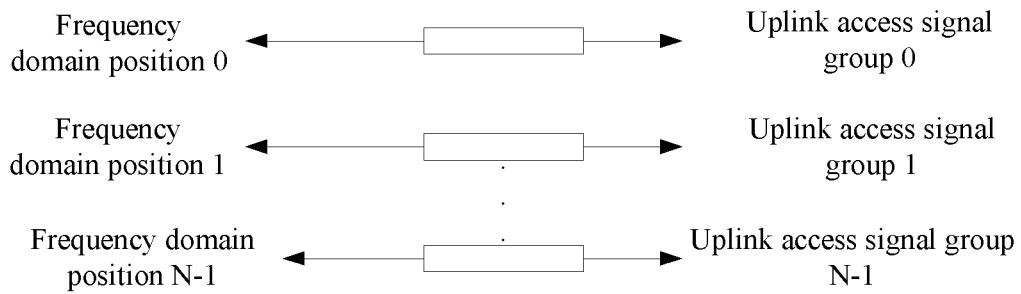
FIG. 15a is a schematic diagram of restriction of an uplink access by utilizing a transmitting order of an uplink access sequence according to an embodiment of the present disclosure.
Figure 15B:
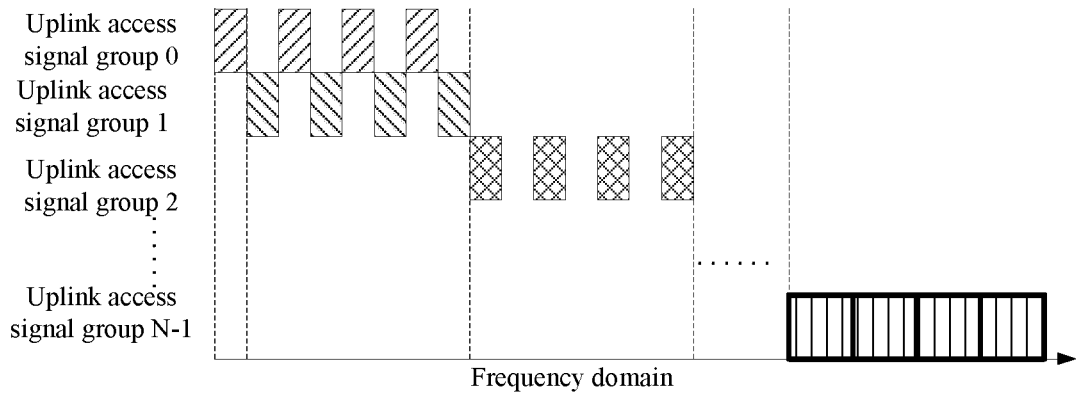
FIG. 15b is a schematic diagram of a mode for distinguishing uplink access signal groups in a frequency domain according to Embodiment 2 of the present disclosure.

After the terminal obtains the correspondence between the N frequency domain resource sets and the N uplink access signal groups, the terminal selects an uplink access signal group i according to an own beam capability, where the number Xi of uplink access signals of group i is approximate to the number of uplink transmitting beams of the terminal. Different uplink access signals of group i are distinguished over corresponding frequency domain resources. The base station receives uplink access signals over time resources corresponding to different uplink access signal groups, and identifies the uplink access signal group i corresponding to the uplink access signals. The base station determines potential positions of subsequent uplink access signals of group i according to a group corresponding to the received uplink access signals, and receives the uplink access signals of group i at these resource positions. FIG. 15a is a schematic diagram of restriction of an uplink access by utilizing a transmitting order of an uplink access sequence according to an embodiment of the present disclosure. FIG. 15b is a schematic diagram of a mode for distinguishing uplink access signal groups in a frequency domain according to Embodiment 2 of the present disclosure. In the embodiment, uplink access frequency domain resources of different groups may be distinguished according to a frequency domain starting position and/or a frequency domain ending position or distinguished according to the number of resources occupied by a frequency domain, where frequency domain units may be sub-carriers or basic frequency domain units constituted by a plurality of sub-carriers or the like.

The base station divides the uplink access into one or more detection thresholds, and after receiving the uplink access signals of group i, the base station determines whether to delay for transmitting the uplink access responses according to the number of resources of uplink access responses of group i, the number of the detection thresholds divided by the base station, and own scheduling resources.

After receiving an answer message, the terminal judges whether a transmitting beam satisfying uplink transmission can be identified. If the transmitting beam satisfying the uplink transmission can be identified, transmitting of subsequent uplink access signals is ended; and otherwise, the subsequent uplink access signals are transmitted.

Sub-Embodiment 1

It is supposed that a base station is configured with 16 uplink access signal groups for uplink access of different terminals. Each uplink access signal group corresponds to at least one uplink access signal. The base station informs the terminals of correspondence between 16 frequency domain resource sets and the 16 uplink access signal groups by means of broadcasts and/or high-layer signaling, as shown in Table 3. In the sub-embodiment, the frequency domain resource sets may include occupied frequency domain unit positions and/or occupied bandwidths, where the occupied bandwidths may be presented by sub-carriers or basic frequency domain units constituted by a plurality of sub-carriers.

TABLE 3

| Uplink access signal group index | Frequency domain resource set for transmitting uplink access signal |
| --- | --- |
| 0 | Frequency domain resource set 0 |
| 1 | Frequency domain resource set 1 |
| ... | ... |
| 15 | Frequency domain resource set 15 |

The base station sets a detection threshold marked as th0, and the terminal receives a base station broadcast message by detecting a downlink signal to identify resource set information of an uplink access signal group. It is supposed that the terminal may basically cover an uplink transmitting area by utilizing four uplink transmitting beams, and the terminal selects group 0 having four access signals to transmit uplink access signals over appointed time resources in a beam forming manner.

The base station receives the uplink access signals of group 0, transmitted by the terminal, and compares with the detection threshold set by the base station. The base station regards that this detection satisfies the threshold th0, and the base station selects a closest resource from uplink access response time resources to transmit an uplink access response.

The terminal detects an uplink access response over frequency resources corresponding to the uplink access response of group 0, the terminal detects the uplink access response of group 0, fed back by the base station, and the terminal cannot judge whether the uplink transmission is satisfied according to the detection threshold th0 corresponding to the uplink access response. The terminal continues transmitting subsequent uplink access signals, and when the terminal receives all uplink access responses corresponding to the threshold th0, the terminal selects an uplink transmitting beam corresponding to an uplink access response and performs subsequent access flow and data transmission.

Sub-Embodiment 2

It is supposed that a base station is configured with eight uplink access signal groups for uplink access of a terminal. As shown in Table 4, a frequency domain resource set may include occupied frequency domain unit positions and/or occupied bandwidths. The occupied bandwidths may be presented by sub-carriers or basic frequency domain units constituted by a plurality of sub-carriers. Each uplink access signal group corresponds to at least one uplink access signal, and the terminal regards that the channel quality of a position of the terminal is high according to channel measurement. Therefore, using of fewer beams is taken into consideration, information of an uplink access signal group is read, and it is learned of that an uplink access signal group 7 includes four uplink access signals. The terminal selects the uplink access signal group 7 for uplink access.

TABLE 4

| Uplink access signal group index | Frequency domain resource set for transmitting uplink access signal |
|---|---|
| 0 | Frequency domain resource set 0 |
| 1 | Frequency domain resource set 1 |
| ... | ... |
| 7 | Frequency domain resource set 7 |

The base station may set four detection thresholds marked as th0-th3. It is supposed that the terminal may basically cover uplink transmitting areas by utilizing four uplink transmitting beams. The terminal selects group 0 having four access signals to transmit uplink access signals over appointed time resources in a beam forming manner.

The base station receives uplink access signals of group 7, transmitted by the terminal, and compares with the detection threshold set by the base station. The base station detects uplink access thresholds th0, th2 and th3 of group 0. After detecting an uplink access signal satisfying the threshold th3, the base station transmits an uplink access response over a closest resource in uplink access response resources corresponding to group 0.

The terminal detects the uplink access response over a resource corresponding to group 0, the terminal detects an uplink access response of group 7, fed back by the base station, and the terminal judges that an uplink transmitting beam corresponding to an uplink access signal of which the access quality meets th3 satisfies uplink transmission according to the detection threshold th3 corresponding to the uplink access response. The terminal ends transmission of subsequent uplink access signals.

Embodiment 3

A base station and a terminal predefine N code domain resource sets to correspond to N uplink access signal groups. Different uplink access signal groups are determined by means of a code domain.

Or, the base station informs correspondence between the N code domain resource sets and the N uplink access signal groups by means of broadcasts and/or high-layer signaling. The base station may be a base station being subjected to synchronization and beam confirmation with the terminal, or may be other base stations having been connected with the terminal for informing the terminal of code domain resource sets corresponding to the N uplink access signal groups.

If the terminal obtains the correspondence between the N code domain resource sets and the N uplink access signal groups by means of broadcasts and/or high-layer signaling, the terminal needs to receive the broadcasts and/or the high-layer signaling first to obtain the correspondence.

Figure 16A:
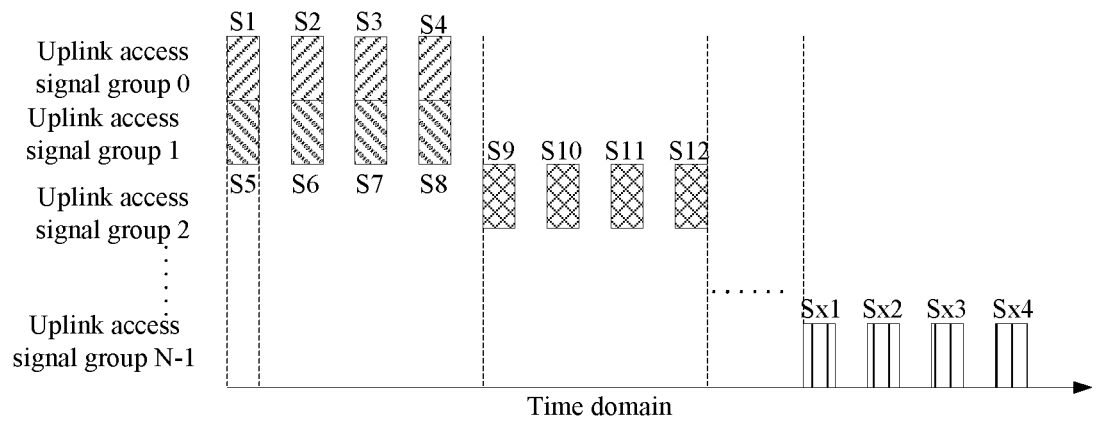
FIG. 16a is a schematic diagram of a mode for distinguishing uplink access signal groups in a code domain when an uplink access is restricted by utilizing a frequency domain resource set according to an embodiment of the present disclosure.
Figure 16B:
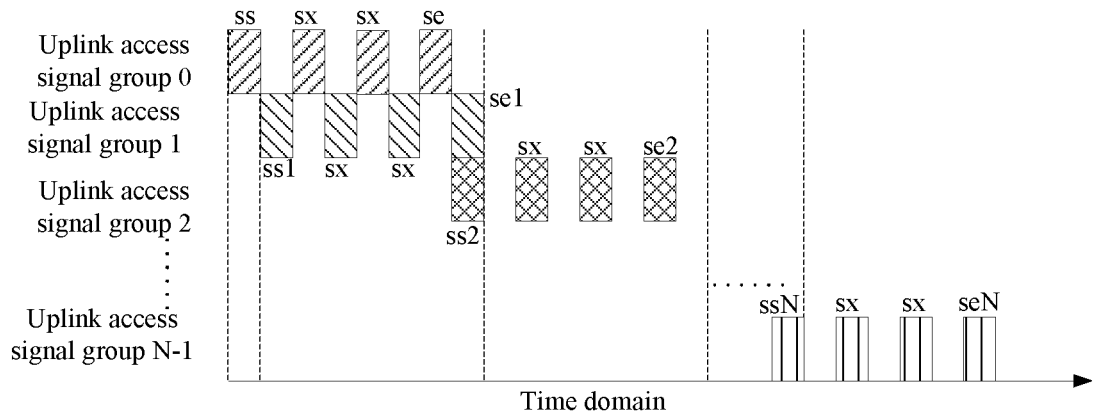
FIG. 16b is a schematic diagram of a mode for distinguishing uplink access signal groups in a code domain when uplink access signals of each uplink access signal group are not required to be aligned in time.

After the terminal obtains the correspondence between the N code domain resource sets and the N uplink access signal groups, the terminal selects an uplink access signal group i according to a measured channel quality situation and an own beam capability, where the number Xi of uplink access signals of group i is approximate to the number of uplink beams needed for uplink access of the terminal. Different uplink access signals of group i are distinguished over corresponding frequency domain resources. The base station receives uplink access signals of a corresponding sequence over resources corresponding to different uplink access signal groups, and identifies the uplink access signal group i corresponding to the uplink access signals. The base station determines potential positions of subsequent uplink access signals of group i according to a group corresponding to the received uplink access signals, and receives the uplink access signals of group i at these resource positions. FIG. 16a is a schematic diagram of a mode for distinguishing uplink access signal groups in a code domain when an uplink access is defined by utilizing a frequency domain resource set according to an embodiment of the present disclosure. In the embodiment, requirements for time resources of uplink access of different groups to different uplink access signal groups are aligned. FIG. 16b is a schematic diagram of a mode for distinguishing uplink access signal groups in a code domain when uplink access signals of each uplink access signal group are not required to be aligned in time. The base station may judge the starting position of the uplink access signal group i according to an access code of the uplink access signal. In the embodiment, code domain units are access sequences capable of being distinguished from each other.

The base station divides the uplink access into one or more detection thresholds, and after receiving the uplink access signals of group i, the base station determines whether to delay for transmitting the uplink access responses or transmitting as soon as possible according to the number of resources of uplink access responses of group i, the number of the detection thresholds divided by the base station, and own scheduling resources.

After receiving an answer message, the terminal judges whether a transmitting beam satisfying uplink transmission can be identified. If the transmitting beam satisfying the uplink transmission can be identified, transmitting of subsequent uplink access signals is ended; and otherwise, the subsequent uplink access signals are transmitted.

Sub-Embodiment 1

It is supposed that a base station is configured with 16 uplink access signal groups for uplink access of different terminals. Each uplink access signal group corresponds to at least one uplink access signal. The base station informs the terminals of correspondence between 16 sequence resource sets and the 16 uplink access signal groups by means of broadcasts and/or high-layer signaling, as shown in Table 5.

TABLE 5

| Uplink access signal group | Sequence resource set for transmitting uplink access signal |
|---|---|
| 0 | Sequence resource set 0 |
| 1 | Sequence resource set 1 |
| ... | ... |
| 15 | Sequence resource set 15 |

The base station sets a detection threshold marked as th0, and the terminal receives a base station broadcast message by detecting a downlink signal to identify resource set information of an uplink access signal group. The base station requires starting access signal time of all uplink access signal groups to be aligned, as shown in FIG. 16a.

The terminal judges that the channel quality of the terminal is poor according to the measured channel quality. Therefore, the terminal adopts more beams to perform uplink access and beam confirmation to the greatest extent. Meanwhile, the own beam capability of the terminal is 8. Therefore, the terminal selects group 0 approximate to the beam capability and transmits uplink access signals over appointed sequence resources in a beam forming manner.

The base station detects an uplink access signal corresponding to a starting sequence at a starting position corresponding to an access signal group. The base station receives uplink access signals of group 0 and compares with the detection threshold set by the base station. The base station regards that this detection satisfies th0, and the base station transmits an uplink access response at a closest uplink access response resource position.

The terminal detects an uplink access response over resources corresponding to the uplink access response of group 0, the terminal detects the uplink access response of group 0, fed back by the base station, and the terminal cannot judge whether the uplink transmission is satisfied according to the detection threshold th0 corresponding to the uplink access response. The terminal continues transmitting subsequent uplink access signals, and when the terminal receives all uplink access responses corresponding to the threshold th0, the terminal selects an uplink transmitting beam corresponding to an uplink access response and performs subsequent access flow and data transmission.

Sub-Embodiment 2

A base station and a terminal appoint ten uplink access signal groups for different terminals to perform uplink access. Each uplink access signal group corresponds to at least one uplink access signal. The correspondence is as shown in Table 6.

TABLE 6

| Uplink access signal group index | Sequence resource set for transmitting uplink access signal |
|---|---|
| 0 | Sequence resource set 0 |
| 1 | Sequence resource set 1 |
| ... | ... |
| 9 | Sequence resource set 9 |

The base station sets four detection thresholds marked as th0-th3. The base station does not require starting access signal time of all uplink access signal groups, wherein starting access time of different groups may be different. The base station determines a starting access signal of an uplink access group according to an access sequence, as shown in FIG. 16b.

The terminal judges that a current channel situation is good according to a measured channel situation, thereby being suitable for performing uplink access by utilizing fewer beams, the terminal knows that an uplink access signal group 4 includes two uplink access signals by reading a broadcast message of the base station, the terminal regards that an uplink transmitting area may be basically covered by utilizing two uplink transmitting beams under the current channel situation, and the terminal selects group 4 having two access signals to transmit appointed sequence resources in a beam forming manner.

The base station detects an uplink access signal corresponding to a starting sequence at a starting position corresponding to each access signal group. The base station detects the corresponding uplink access signal at the starting position of group 4, and compares with the detection threshold set by the base station. The base station detects an access signal conforming to the threshold th2 first. At this time, the base station does not transmit an uplink access response temporarily, and the base station also detects another access signal, which satisfies the threshold th3, in the same group subsequently. After detecting th3, the base station transmits the uplink access response over the closest uplink access response resource.

The terminal detects the uplink access response over a corresponding resource after transmitting the uplink access signal. If the terminal does not receive the uplink access response after transmitting the first uplink access signal, the terminal continues transmitting subsequent uplink access signals of group 0. When detecting an uplink access response of group 0, fed back by the base station, the terminal judges that an uplink transmitting beam satisfies uplink transmission according to the detection threshold th3 corresponding to the uplink access response, performs subsequent access flow and uplink data transmission, and ends transmitting of subsequent uplink access signals of group 0.

Embodiment 4

It is supposed that a base station utilizes N uplink access signal groups for uplink access of different terminals. The base station and the terminals predefine X uplink access signal sequence sets and Y uplink access signal time domain resource sets to constitute X*Y=N sequence time domain resource sets corresponding to N uplink access signal groups, where X≥1, and Y≥1.

Or, the base station informs correspondence between N sequence time domain resource sets and the N uplink access signal groups by means of broadcasts and/or high-layer signaling.

If the terminal obtains the correspondence between the N sequence time domain resource sets and the N uplink access signal groups by means of broadcasts and/or high-layer signaling, the terminal needs to receive the broadcasts and/or the high-layer signaling first to obtain the correspondence.

Figure 17:
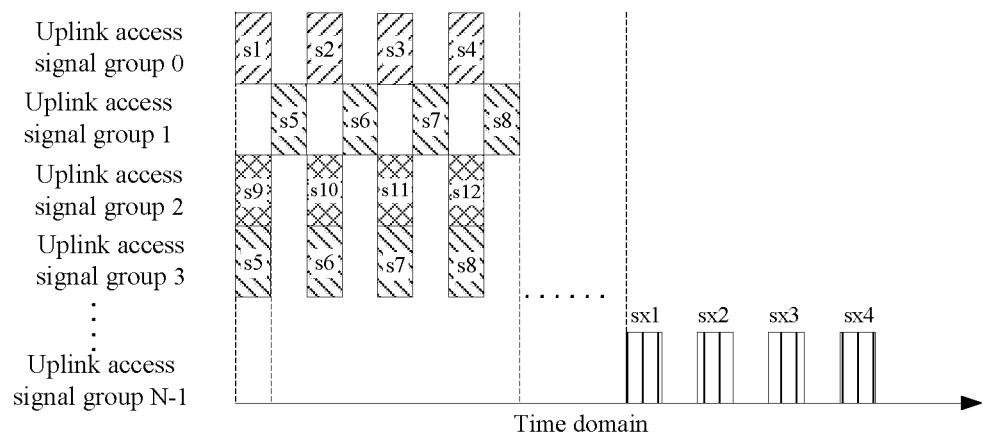
FIG. 17 is a schematic diagram of a principle for co-restricting an uplink access by utilizing a time domain and a transmitting order of an uplink access sequence according to an embodiment of the present disclosure.

After the terminal obtains the correspondence between the N sequence time domain resource sets and the N uplink access signal groups, the terminal selects an uplink access signal group i according to a measured channel situation and an own beam capability, where the number Xi of uplink access signals of group i is approximate to the number of uplink transmitting beams of the terminal. Different uplink access signals of group i are distinguished by means of time domain positions and/or sequence sets. The base station receives uplink access signals of a corresponding sequence over time domain resources corresponding to different uplink access signal groups, and identifies the uplink access signal group i corresponding to the uplink access signals. The base station determines potential positions of subsequent uplink access signals of group i according to a group corresponding to the received uplink access signals, and receives the uplink access signals of group i at these resource positions. FIG. 17 is a schematic diagram of a principle for co-restricting an uplink access by utilizing a time domain and a transmitting order of an uplink access sequence according to an embodiment of the present disclosure. In the embodiment, some of the uplink access signal groups are coincided in time but have different access sequences, and some access sequences are identical but corresponding time is different. Uplink access time resources of different groups are required to be aligned to one or more positions.

The base station divides the uplink access into one or more detection thresholds, and after receiving the uplink access signals of group i, the base station determines whether to delay for transmitting the uplink access responses or transmitting as soon as possible according to the number of resources of uplink access responses of group i, the number of the detection thresholds divided by the base station, and own scheduling resources.

After receiving an answer message, the terminal judges whether a transmitting beam satisfying uplink transmission can be identified. If the transmitting beam satisfying the uplink transmission can be identified, transmitting of subsequent uplink access signals is ended; and otherwise, the subsequent uplink access signals are transmitted.

In the embodiment, each uplink access signal sequence time domain resource set includes at least one uplink access signal sequence and a time domain resource set.

For example, an uplink access signal sequence time domain resource set 0 includes: an uplink access signal sequence set 0 and an uplink access signal transmitting time domain resource set 0.

An uplink access signal sequence time domain resource set 1 includes: an uplink access signal sequence set 1 and an uplink access signal transmitting time domain resource set 1.

Or, an uplink access signal sequence time domain resource set 0 includes: an uplink access signal sequence set 0 and an uplink access signal transmitting time domain resource set 0.

An uplink access signal sequence time domain resource set 1 includes: an uplink access signal sequence set 0 and an uplink access signal transmitting time domain resource set 1.

Or, an uplink access signal sequence time domain resource set 0 includes: an uplink access signal sequence set 0 and an uplink access signal transmitting time domain resource set 0.

An uplink access signal sequence time domain resource set 1 includes: an uplink access signal sequence set 1 and an uplink access signal transmitting time domain resource set 0, and so on.

Sub-Embodiment 1

It is supposed that a base station is configured with eight uplink access signal groups for uplink access of different terminals. Each uplink access signal group contains at least one uplink access signal. The base station informs the terminals of correspondence between eight sequence time domain resource sets and the eight uplink access signal groups by means of broadcasts and/or high-layer signaling, as shown in Table 7.

TABLE 7

| Uplink access signal group | Sequence time domain resource set for transmitting uplink access signal |
| --- | --- |
| 0 | Sequence time domain resource set 0 |
| 1 | Sequence time domain resource set 1 |
| . . . | . . . |
| 7 | Sequence time domain resource set 7 |

The base station sets a detection threshold marked as th0, and the terminal receives a base station broadcast message by detecting a downlink signal to identify resource set configuration information of an uplink access signal group. The base station requires starting access signals of all uplink access signal groups to be aligned to one or more moments, as shown in FIG. 17.

The terminal regards that the current channel quality is poor according to the measured channel quality, and more beams should be adopted for access and uplink beam confirmation. There are four beams of the terminal, the terminal finally utilizes four uplink transmitting beams to perform uplink access and beam confirmation, and the terminal selects group 0 having four access signals and transmits uplink access signals over appointed sequence resources in a beam forming manner.

The base station detects an uplink access signal corresponding to a starting sequence at a starting position corresponding to an access signal group. The base station receives the uplink access signal of the terminal at a starting time point of group 0 and compares with the detection threshold set by the base station. The base station regards that this detection satisfies the threshold th0, and the base station transmits an uplink access response over a closest time resource.

The terminal detects an uplink access response over resources corresponding to the uplink access response of group 0, and the terminal detects the uplink access response of group 0, fed back by the base station. The terminal cannot judge whether the uplink transmission is satisfied according to the detection threshold th0 corresponding to the uplink access response. The terminal continues transmitting subsequent uplink access signals, and when the terminal receives all uplink access responses corresponding to the threshold th0, the terminal selects an uplink transmitting beam corresponding to an uplink access response and performs subsequent access flow and data transmission.

Sub-Embodiment 2

It is supposed that a base station is configured with ten uplink access signal groups for uplink access of different terminals. Each uplink access signal group contains at least one uplink access signal. The base station informs the terminals of correspondence between ten sequence time domain resource sets and the ten uplink access signal groups by means of broadcasts and/or high-layer signaling, as shown in Table 8.

TABLE 8

| Uplink access signal group | Sequence time domain resource set for transmitting uplink access signal |
|---|---|
| 0 | Sequence time domain resource set 0 |
| 1 | Sequence time domain resource set 1 |
| ... | ... |
| 9 | Sequence time domain resource set 9 |

The base station may set four detection thresholds marked as th0-th3 respectively, and the terminal receives a base station broadcast message by detecting a downlink signal to identify resource set information of an uplink access signal group. The base station requires starting access signals of all uplink access signal groups to be aligned to one or more moments, as shown in FIG. 17.

It is supposed that terminal 1 determines to cover an uplink transmitting area thereof by utilizing four uplink transmitting beams according to channel measurement quality and an own beam capability, terminal 2 determines that there are two uplink transmitting beams according to channel measurement quality and an own beam capability, and terminal 1 and terminal 2 select group 2 having four access signals and transmits uplink access signals over appointed sequence resources in a beam forming manner.

The base station receives uplink access signals of corresponding sequences at time corresponding to the access signal group 0. The base station receives the uplink access signals of group 0, transmitted by the terminal, at a starting time point of group 0, and compares with the detection thresholds set by the base station to obtain detection values of uplink signals at four positions corresponding to group 0 namely th0, th0, th1 and th3, respectively. The base station transmits two uplink access responses respectively when receiving the second uplink access signal and the fourth uplink access signal of group 0, the corresponding detection thresholds being th0 and th3 respectively.

Terminal 1 and terminal 2 detect uplink access responses over resources corresponding to the uplink access responses of group 0. Terminal 1 detects that the base station feeds back an uplink access response corresponding to the detection value th0, and selects an uplink transmitting beam satisfying uplink transmission. Terminal 2 continues transmitting subsequent uplink access signals, and when the terminal receives all uplink access responses corresponding to the threshold th3, the terminal selects an uplink transmitting beam corresponding to the uplink access response of th3 and performs subsequent access flow or data transmission.

Embodiment 5

It is supposed that a base station utilizes N uplink access signal groups for uplink access of different terminals. The base station and the terminals predefine X uplink access signal sequence sets and Y uplink access signal frequency domain resource sets to constitute X*Y=N sequence frequency domain resource sets corresponding to the N uplink access signal groups, where X≥1, and Y≥1.

Or, the base station informs correspondence between N sequence frequency domain resource sets and the N uplink access signal groups by means of broadcasts and/or high-layer signaling. The present base station informs the terminals by means of the broadcasts, or informs the terminals by means of another base station having been connected with the terminals under the same coverage by means of the high-layer signaling.

Figure 18:
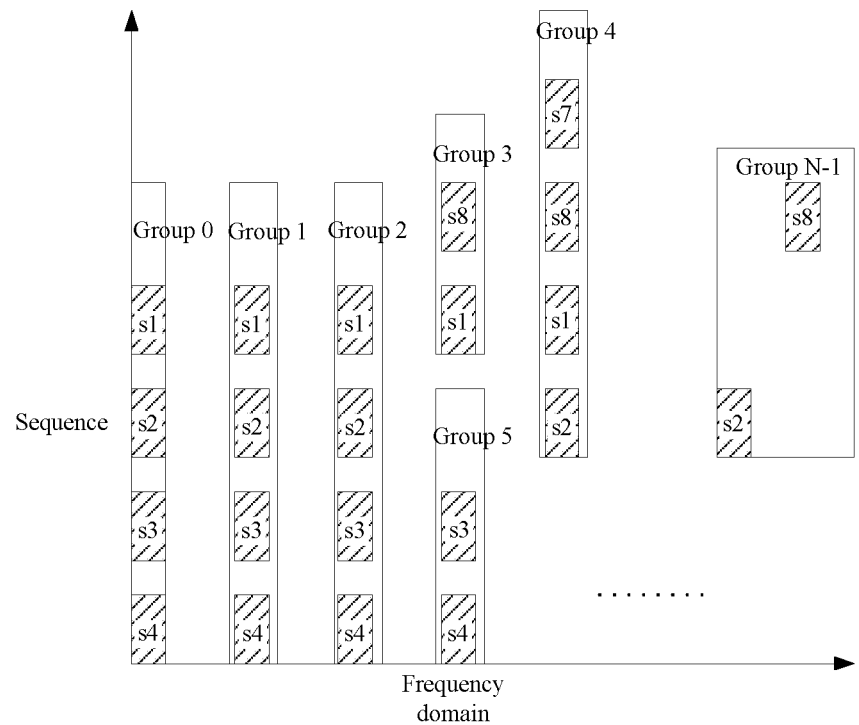
FIG. 18 is a schematic diagram of a principle for co-restricting an uplink access by utilizing time domain and frequency domain resource sets according to an embodiment of the present disclosure.

If the terminal obtains the correspondence between the N sequence frequency domain resource sets and the N uplink access signal groups by means of the broadcasts and/or the high-layer signaling, the terminal needs to receive the broadcasts and/or the high-layer signaling first to obtain the correspondence. The terminal identifies different uplink transmitting beams by means of uplink access signal frequency domain sequence sets. The terminal transmits uplink access signals in a beam forming manner by utilizing uplink access signals corresponding to the N sequence frequency domain resource sets. In the embodiment, each uplink access signal sequence frequency domain resource set includes at least one uplink access signal sequence and a frequency domain resource set. As shown in FIG. 18, FIG. 18 is a schematic diagram of a principle for co-restricting an uplink access by utilizing time domain and frequency domain resource sets according to an embodiment of the present disclosure. In the embodiment, one dimension at least over frequency domain resources and sequence resources of different groups may be distinguished.

For example, an uplink access signal sequence frequency domain resource set 0 includes: an uplink access signal sequence set 0 and an uplink access signal transmitting frequency domain resource set 0.

An uplink access signal sequence frequency domain resource set 1 includes: an uplink access signal sequence set 1 and an uplink access signal transmitting frequency domain resource set 1.

Or, an uplink access signal sequence frequency domain resource set 0 includes: an uplink access signal sequence set 0 and an uplink access signal transmitting frequency domain resource set 0.

An uplink access signal sequence frequency domain resource set 1 includes: an uplink access signal sequence set 0 and an uplink access signal transmitting frequency domain resource set 1.

Or, an uplink access signal sequence frequency domain resource set 0 includes: an uplink access signal sequence set 0 and an uplink access signal transmitting frequency domain resource set 0.

An uplink access signal sequence frequency domain resource set 1 includes: an uplink access signal sequence set 1 and an uplink access signal transmitting frequency domain resource set 0, and so on.

Sub-Embodiment 1

It is supposed that a base station is configured with eight uplink access signal groups for uplink access of different terminals. Each uplink access signal group contains at least one uplink access signal, and the base station and the terminals predefine eight uplink access signal sequence frequency domain resource sets corresponding to the eight uplink access signal groups respectively.

Or, the base station informs the terminals of correspondence between the eight uplink access signal sequence frequency domain resource sets and the eight uplink access signal groups by means of broadcasts and/or high-layer signaling, as shown in Table 9.

TABLE 9

| Uplink access signal group | Uplink access signal sequence frequency domain resource set for transmitting uplink access signal |
|---|---|
| 0 | Uplink access signal sequence frequency domain resource set 0 |
| 1 | Uplink access signal sequence frequency domain resource set 1 |
| 2 | Uplink access signal sequence frequency domain resource set 2 |
| 3 | Uplink access signal sequence frequency domain resource set 3 |
| 4 | Uplink access signal sequence frequency domain resource set 4 |
| 5 | Uplink access signal sequence frequency domain resource set 5 |
| 6 | Uplink access signal sequence frequency domain resource set 6 |
| 7 | Uplink access signal sequence frequency domain resource set 7 |

The terminal receives a base station broadcast and/or high-layer signaling by detecting a downlink signal to identify uplink access signal sequence frequency domain resource set information.

The base station sets a detection threshold marked as th0, and the terminal receives a base station broadcast message by detecting a downlink signal to identify resource set information of an uplink access signal group.

The terminal determines to perform uplink access and initial beam confirmation by using four uplink transmitting beams according to a measured channel situation and an own beam capability, and the terminal selects group 2 having four access signals and transmits uplink access signals over appointed sequence frequency resources in a beam forming manner.

The base station detects an uplink access signal of a corresponding sequence at a frequency domain position corresponding to an access signal group. The base station receives the uplink access signal of the corresponding sequence at the frequency domain position of group 2 and compares with the detection threshold set by the base station. The base station determines that this detection satisfies the threshold th0, and the base station transmits an uplink access response at a closest uplink access response resource position.

The terminal detects an uplink access response over resources corresponding to group 2, and the terminal detects the uplink access response of group 2, fed back by the base station. The terminal cannot judge whether the uplink transmission is satisfied according to the detection threshold th0 corresponding to the uplink access response. The terminal continues transmitting subsequent uplink access signals, and when the terminal receives all uplink access responses corresponding to the threshold th0, the terminal selects an uplink transmitting beam corresponding to an uplink access response and performs subsequent access flow or data transmission.

Sub-Embodiment 2

It is supposed that a base station is configured with 16 uplink access signal groups for uplink access of different terminals. Each uplink access signal group contains at least one uplink access signal. The base station and the terminals predefine 16 uplink access signal sequence frequency domain resource sets corresponding to the 16 uplink access signal groups respectively, as shown in Table 10a.

TABLE 10a

| Uplink access signal group | Uplink access signal sequence frequency domain resource set for transmitting uplink access signal |
|---|---|
| 0 | Uplink access signal sequence frequency domain resource set 0 |
| 1 | Uplink access signal sequence frequency domain resource set 1 |
| ... | ... |
| 15 | Uplink access signal sequence frequency domain resource set 15 |

The base station sets four detection thresholds marked as th0-th3.

The terminal determines to perform uplink access and beam confirmation according to a channel measurement situation by using beams as many as possible.

It is supposed that the terminal is capable of transmitting multiple beams simultaneously. Specifically, four uplink transmitting beams of the terminal are divided into two groups marked as txG1 and txG2, each group contains two transmitting beams, inter-group beams are transmitted in a time division manner, and intra-group beams are transmitted in parallel. It is supposed that the terminal transmits txG1 and then transmits txG2. txG1 selects an uplink access signal group 3 to transmit an uplink access signal in a beam forming form, and txG2 selects an uplink access signal group 2 to transmit an uplink access signal in a beam forming form.

The base station detects uplink access signals of corresponding sequences at frequency domain positions corresponding to these uplink access signals. The base station detects uplink access signals of corresponding sequences at frequency domain positions of group 3 and group 2, and compares with the detection thresholds set by the base station to determine that two access signals of group 3 satisfy the thresholds th0 and th2 respectively and two access signals of group 2 satisfy the thresholds th1 and th3 respectively. When receiving the access signals satisfying the thresholds th0 and th2, the base station cannot transmit uplink access responses immediately, and after detecting the uplink access signal satisfying the threshold th3, the base station transmits the uplink access response at a closest uplink access response position.

After transmitting the uplink access signal, the terminal does not detect the uplink access response at the corresponding access response resource position of group 3, the terminal continues transmitting the uplink access signal of group 2, the detection threshold corresponding to the uplink access response of group 2 is th3, and the terminal determines an uplink transmitting beam for uplink transmission according to the corresponding threshold th3.

Sub-Embodiment 3

It is supposed that a base station configures four grades for uplink access, each grade containing four uplink access signal groups. There are 16 uplink access signal groups for uplink access of a terminal. Each uplink access signal group contains at least one uplink access signal. The base station informs the terminal of sequence frequency domain resource sets of uplink access signals corresponding to the 16 uplink access signal groups in four grades, as shown in Table 10b.

TABLE 10b

| Uplink access signal grade | Uplink access signal group | Uplink access signal sequence frequency domain resource set for transmitting uplink access signal |
|---|---|---|
| 0 | 0 | Uplink access signal sequence frequency domain resource set 0 |
|   | 1 | Uplink access signal sequence frequency domain resource set 1 |
|   | 2 | Uplink access signal sequence frequency domain resource set 2 |
|   | 3 | Uplink access signal sequence frequency domain resource set 3 |
| 1 | 4 | Uplink access signal sequence frequency domain resource set 4 |
|   | 5 | Uplink access signal sequence frequency domain resource set 5 |
|   | 6 | Uplink access signal sequence frequency domain resource set 6 |
|   | 7 | Uplink access signal sequence frequency domain resource set 7 |
| 2 | 8 | Uplink access signal sequence frequency domain resource set 8 |
|   | 9 | Uplink access signal sequence frequency domain resource set 9 |
|   | 10 | Uplink access signal sequence frequency domain resource set 10 |
|   | 11 | Uplink access signal sequence frequency domain resource set 11 |
| 3 | 12 | Uplink access signal sequence frequency domain resource set 12 |
|   | 13 | Uplink access signal sequence frequency domain resource set 13 |
|   | 14 | Uplink access signal sequence frequency domain resource set 14 |
|   | 15 | Uplink access signal sequence frequency domain resource set 15 |

The base station sets four detection thresholds marked as th0-th3.

The terminal determines to perform uplink access and beam confirmation according to a channel measurement situation by using beams as many as possible.

It is supposed that the terminal is capable of transmitting multiple beams simultaneously. Specifically, four uplink transmitting beams of the terminal are marked as beamTx0-beamTx3, where beamTx0 and beamTx1 belong to txG1, and beamTx2 and beamTx3 belong to txG2, each group containing two transmitting beams. The terminal selects uplink access signal groups 4 and 5 to transmit uplink access signals, wherein inter-group beams are transmitted in parallel, and intra-group beams are transmitted in a time division manner. For example, beamTx0 transmits txG1 at a time t, beamTx2 transmits txG2 at the time t, beamTx1 transmits txG1 at a time t+Δ, and beamTx3 transmits txG2 at the time t+Δ.

The base station detects uplink access signals of corresponding sequences at frequency domain positions corresponding to the uplink access signal groups. The base station detects uplink access signals of corresponding sequences at frequency domain positions of group 4 and group 5, and compares with the detection thresholds set by the base station to determine that two access signals of group 4 satisfy the thresholds th0 and th2 respectively and two access signals of group 5 satisfy the thresholds th1 and th3 respectively. When receiving the access signals satisfying the thresholds th0 and th2, the base station does not transmit uplink access responses immediately, and after detecting the uplink access signal satisfying the threshold th3, the base station transmits the uplink access response at a closest uplink access response position.

After transmitting the uplink access signals, the terminal does not detect the uplink access responses at the corresponding access response resource positions of group 4 and group 5, the terminal continues transmitting the uplink access signals of group 4 and group 5, the detection threshold corresponding to the uplink access response of group 5 is th3, and the terminal determines an uplink transmitting beam for uplink transmission according to the corresponding threshold th3.

Embodiment 6

It is supposed that a base station utilizes N uplink access signal groups for uplink access of different terminals. The base station and the terminals predefine X uplink access signal time domain resource sets and Y uplink access signal frequency domain resource sets to constitute $X*Y=N$ sequence frequency domain resource sets corresponding to the N uplink access signal groups, where $X \geq 1$, and $Y \geq 1$.

Or, the base station informs correspondence between N time domain frequency domain resource sets and the N uplink access signal groups by means of broadcasts and/or high-layer signaling. The present base station may inform the terminals of the correspondence by means of the broadcasts and/or the high-layer signaling, or informs the terminals by means of another base station having been connected with the terminals under the same coverage by means of the high-layer signaling.

Figure 19:
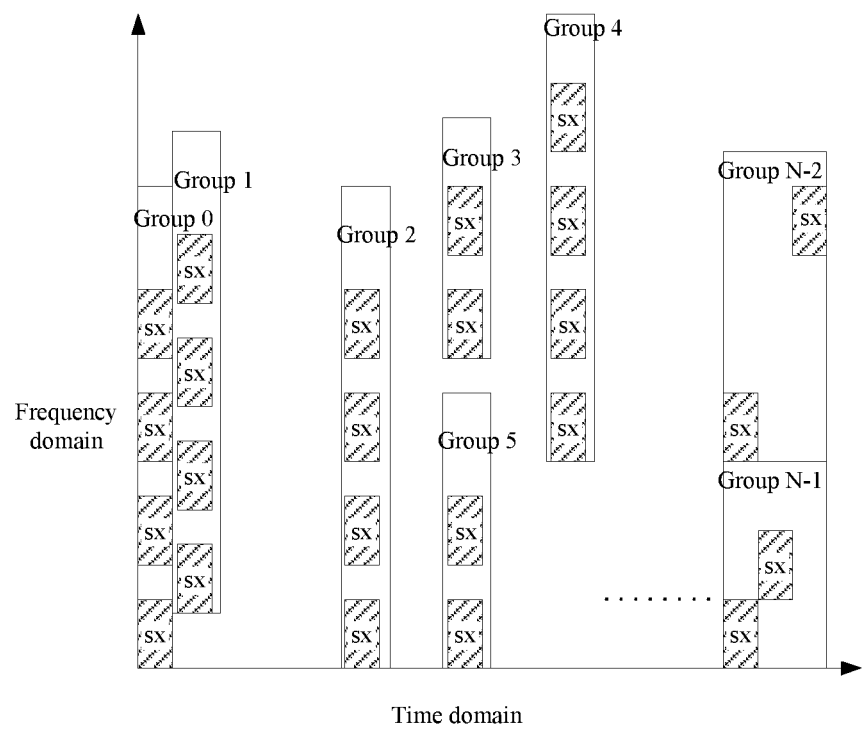
FIG. 19 is a schematic diagram of a principle for co-restricting an uplink access by utilizing time domain and frequency domain resource sets and a transmitting order of an uplink access sequence according to an embodiment of the present disclosure.

If the terminal obtains the correspondence between the N time domain frequency domain resource sets and the N uplink access signal groups by means of the broadcasts and/or the high-layer signaling, the terminal needs to receive the broadcasts and/or the high-layer signaling first to obtain the correspondence. The base station and the terminal identify different uplink access signal groups by means of uplink access signal time domain frequency domain sets. The terminal transmits uplink transmitting beams of the terminal covered by the uplink access signals in a beam forming manner by utilizing uplink access signals corresponding to the N time domain frequency domain resource sets. In the embodiment, each uplink access signal time domain frequency domain resource set includes at least one time domain resource set and a frequency domain resource set. As shown in FIG. 19, FIG. 19 is a schematic diagram of a principle for co-restricting an uplink access by utilizing time domain and frequency domain resource sets and a transmitting order of an uplink access sequence according to an embodiment of the present disclosure. Herein, uplink access signal sequences configured for the terminal by the base station are not restricted, and the base station and the terminal identify different uplink transmitting beams by means of time domain and frequency domain resource sets of the uplink access signals.

For example, an uplink access signal time domain and frequency domain combined position 0 includes: an uplink access signal transmitting time domain resource set 0 and an uplink access signal transmitting frequency domain resource set 0.

An uplink access signal sequence frequency domain resource set 1 includes: an uplink access signal transmitting time domain resource set 1 and an uplink access signal transmitting frequency domain resource set 1.

Or, an uplink access signal sequence frequency domain resource set 0 includes: an uplink access signal transmitting time domain resource set 0 and an uplink access signal transmitting frequency domain resource set 0.

An uplink access signal sequence frequency domain resource set 1 includes: an uplink access signal transmitting time domain resource set 0 and an uplink access signal transmitting frequency domain resource set 1.

Or, an uplink access signal sequence frequency domain resource set 0 includes: an uplink access signal transmitting time domain resource set 0 and an uplink access signal transmitting frequency domain resource set 0.

An uplink access signal sequence frequency domain resource set 1 includes: an uplink access signal transmitting time domain resource set 1 and an uplink access signal transmitting frequency domain resource set 0, and so on.

Sub-Embodiment 1

It is supposed that a base station is configured with eight uplink access signal groups for uplink access of different terminals. Each uplink access signal group contains at least one uplink access signal. The base station and the terminals predefine correspondence between eight uplink access signal sequence frequency domain resource sets and the eight uplink access signal groups, as shown in Table 11.

TABLE 11

| Uplink access signal group index | Uplink access signal time domain and frequency domain combined position for transmitting uplink access signal |
|---|---|
| 0 | Uplink access signal time domain and frequency domain resource set 0 |
| 1 | Uplink access signal time domain and frequency domain resource set 1 |
| 2 | Uplink access signal time domain and frequency domain resource set 2 |
| 3 | Uplink access signal time domain and frequency domain resource set 3 |
| 4 | Uplink access signal time domain and frequency domain resource set 4 |
| 5 | Uplink access signal time domain and frequency domain resource set 5 |
| 6 | Uplink access signal time domain and frequency domain resource set 6 |
| 7 | Uplink access signal time domain and frequency domain resource set 7 |

The base station sets a detection threshold marked as th0.

The terminal determines to perform uplink access and preliminary confirmation for uplink transmitting beams by utilizing four uplink transmitting beams according to a channel measurement situation and a beam capability of the terminal, and the terminal selects group 0 having four access signals to transmit uplink access signals over appointed time frequency resources in a beam forming manner.

The base station detects uplink access signals at time frequency positions corresponding to access signal groups. The base station detects an uplink access signal of a corresponding sequence at a frequency domain position corresponding to group 0, and compares with the detection threshold set by the base station to determine that this access signal satisfies the threshold th0. The base station transmits an uplink access response over a closest uplink access response resource position, and when subsequently receiving uplink access and satisfying the threshold th0, the base station transmits an uplink access response at the last response resource position corresponding to group 0.

The terminal detects an uplink access response over resources corresponding to the uplink access response of group 0, the terminal detects that the detection threshold corresponding to the uplink access response of group 0, fed back by the base station, is th0, and the terminal cannot judge whether the uplink transmission is satisfied. The terminal continues transmitting subsequent uplink access signals, and when the terminal receives all uplink access responses corresponding to the threshold th0, the terminal selects an uplink transmitting beam corresponding to an uplink access response and performs subsequent access flow or data transmission.

Embodiment 7

It is supposed that a base station utilizes N uplink access signal groups for uplink access of different terminals. The base station and the terminals predefine X uplink access signal time domain resource sets, Y uplink access signal frequency domain resource sets and Z uplink access sequence resource sets to constitute X*Y*Z=N sequence frequency domain resource sets corresponding to the N uplink access signal groups respectively, where X≥1, Y≥1, Z≥1, and an uplink access signal group includes at least one uplink access resource.

Or, the base station informs the terminals of correspondence between N sequence time domain, frequency domain and code domain resource sets and the N uplink access signal groups by means of broadcasts and/or high-layer signaling. The present base station may inform the terminals of the correspondence by means of the broadcasts and/or the high-layer signaling, or informs the terminals by means of another base station having been connected with the terminals under the same coverage by means of the high-layer signaling.

If the terminal obtains the correspondence between the N sequence time domain, frequency domain and code domain resource sets and the N uplink access signal groups by means of the broadcasts and/or the high-layer signaling, the terminal needs to receive the broadcasts and/or the high-layer signaling first to obtain the correspondence. The base station and the terminal identify different uplink access signal groups by means of uplink access signal time domain, frequency domain and code domain sets. The terminal transmits uplink transmitting beams of the terminal covered by the uplink access signals in a beam forming manner by utilizing uplink access signals corresponding to the N sequence time domain, frequency domain and code domain resource sets. In the embodiment, each uplink access signal time domain frequency domain resource set includes at least one time domain resource set, a frequency domain resource set and a code domain resource set, as shown in FIG. 19. Herein, different groups may be distinguished by means of one dimension in a time frequency code, and accordingly, the base station and the terminal identify different uplink transmitting beams.

For example, an uplink access signal time domain, frequency domain and code domain combined position set 0 includes: a sequence in an uplink access signal set 0 used by an uplink access signal, an uplink access signal transmitting time domain position 0 and an uplink access signal transmitting frequency domain position 0.

An uplink access signal time domain, frequency domain and code domain set 1 includes: a sequence in an uplink access signal set 1 used by an uplink access signal, an uplink access signal transmitting time domain position 1 and an uplink access signal transmitting frequency domain position 1.

Or, an uplink access signal time domain, frequency domain and code domain set 0 includes: a sequence in an uplink access signal set 0 used by an uplink access signal, an uplink access signal transmitting time domain position 0 and an uplink access signal transmitting frequency domain position 0.

An uplink access signal time domain, frequency domain and code domain set 1 includes: a sequence in an uplink access signal set 0 used by an uplink access signal, an uplink access signal transmitting time domain position 0 and an uplink access signal transmitting frequency domain position 1.

Or, an uplink access signal time domain, frequency domain and code domain set 0 includes: a sequence in an uplink access signal set 0 used by an uplink access signal, an uplink access signal transmitting time domain position 0 and an uplink access signal transmitting frequency domain position 0.

An uplink access signal time domain, frequency domain and code domain set 1 includes: a sequence in an uplink access signal set 0 used by an uplink access signal, an uplink access signal transmitting time domain position 1 and an uplink access signal transmitting frequency domain position 0.

Or, an uplink access signal time domain, frequency domain and code domain set 0 includes: a sequence in an uplink access signal set 0 used by an uplink access signal, an uplink access signal transmitting time domain position 0 and an uplink access signal transmitting frequency domain position 0.

An uplink access signal time domain, frequency domain and code domain set 1 includes: a sequence in an uplink access signal set 0 used by an uplink access signal, an uplink access signal transmitting time domain position 1 and an uplink access signal transmitting frequency domain position 1.

Or, an uplink access signal time domain, frequency domain and code domain set 0 includes: a sequence in an uplink access signal set 0 used by an uplink access signal, an uplink access signal transmitting time domain position 0 and an uplink access signal transmitting frequency domain position 0.

An uplink access signal time domain, frequency domain and code domain set 1 includes: a sequence in an uplink access signal set 1 used by an uplink access signal, an uplink access signal transmitting time domain position 0 and an uplink access signal transmitting frequency domain position 0.

Or, an uplink access signal time domain, frequency domain and code domain set 0 includes: a sequence in an uplink access signal set 0 used by an uplink access signal, an uplink access signal transmitting time domain position 0 and an uplink access signal transmitting frequency domain position 0.

An uplink access signal time domain, frequency domain and code domain set 1 includes: a sequence in an uplink access signal set 1 used by an uplink access signal, an uplink access signal transmitting time domain position 0 and an uplink access signal transmitting frequency domain position 1.

Or, an uplink access signal time domain, frequency domain and code domain set 0 includes: a sequence in an uplink access signal set 0 used by an uplink access signal, an uplink access signal transmitting time domain position 0 and an uplink access signal transmitting frequency domain position 0.

An uplink access signal time domain, frequency domain and code domain set 1 includes: a sequence in an uplink access signal set 1 used by an uplink access signal, an uplink access signal transmitting time domain position 1 and an uplink access signal transmitting frequency domain position 0.

Or, an uplink access signal time domain, frequency domain and code domain set 0 includes: a sequence in an uplink access signal set 0 used by an uplink access signal, an uplink access signal transmitting time domain position 0 and an uplink access signal transmitting frequency domain position 0.

An uplink access signal time domain, frequency domain and code domain set 1 includes: a sequence in an uplink access signal set 1 used by an uplink access signal, an uplink access signal transmitting time domain position 1 and an uplink access signal transmitting frequency domain position 1, and so on.

Sub-Embodiment 1

It is supposed that a base station is configured with eight uplink access signal groups for uplink access of different terminals. Each uplink access signal group contains at least one uplink access signal. The base station and the terminals predefine correspondence between eight uplink access signal sequence frequency domain resource sets and the eight uplink access signal groups, as shown in Table 12.

TABLE 12

| Uplink access signal group index | Uplink access signal time domain, frequency domain and code domain combined set for uplink access signal |
| --- | --- |
| 0 | Uplink access signal time domain, frequency domain and code domain resource set 0 |
| 1 | Uplink access signal time domain, frequency domain and code domain resource set 1 |
| 2 | Uplink access signal time domain, frequency domain and code domain resource set 2 |
| 3 | Uplink access signal time domain, frequency domain and code domain resource set 3 |

TABLE 12-continued

| Uplink access signal group index | Uplink access signal time domain, frequency domain and code domain combined set for uplink access signal |
| --- | --- |
| 4 | Uplink access signal time domain, frequency domain and code domain resource set 4 |
| 5 | Uplink access signal time domain, frequency domain and code domain resource set 5 |
| 6 | Uplink access signal time domain, frequency domain and code domain resource set 6 |
| 7 | Uplink access signal time domain, frequency domain and code domain resource set 7 |

The base station may set four detection thresholds marked as th0-th3 respectively.

The terminal determines to perform uplink access and preliminary confirmation for uplink transmitting beams by utilizing four uplink transmitting beams according to a measured channel quality situation and an own beam capability, and the terminal selects group 0 having four access signals to transmit uplink access signals of corresponding sequences of group 0 over appointed time frequency resources in a beam forming manner.

The base station detects uplink access signals at time frequency positions corresponding to access signal groups. The base station detects an uplink access signal of a corresponding sequence at a frequency domain position corresponding to group 0, and compares with the detection thresholds set by the base station to determine that this access signal satisfies the threshold th0. The base station transmits an uplink access response over a closest uplink access response resource position, and when subsequently receiving uplink access and satisfying the threshold th0, the base station transmits an uplink access response at the last response resource position corresponding to group 0. Information of the threshold satisfied by the uplink access signals is implied in data bits of the uplink access response, and the threshold satisfied by uplink access may be determined by demodulation according to different scrambles.

The terminal detects an uplink access response over resources corresponding to the uplink access response of group 0, the terminal attempts to detect, by means of different demodulation scrambles, that the detection threshold corresponding to the uplink access response of group 0, fed back by the base station, is th0, and the terminal cannot judge whether the uplink transmission is satisfied. The terminal continues transmitting subsequent uplink access signals, and when the terminal receives all uplink access responses corresponding to the threshold th0, the terminal selects an uplink transmitting beam corresponding to an uplink access response and performs subsequent access flow or data transmission.

Figure 20:
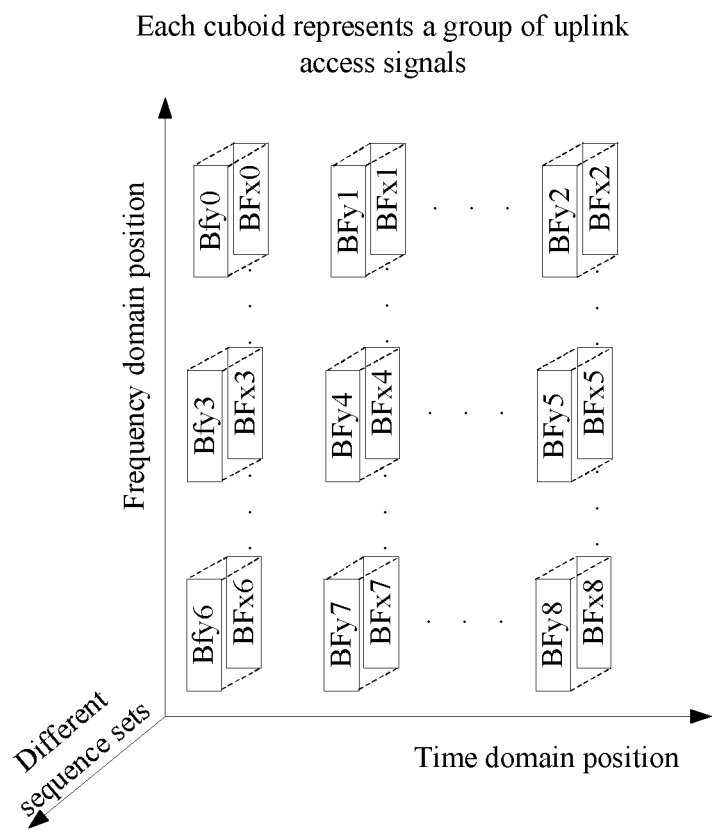
FIG. 20 is a schematic diagram of a principle for an access process in which a first communication node defines only one detection threshold according to an embodiment of the present disclosure.
Figure 21:
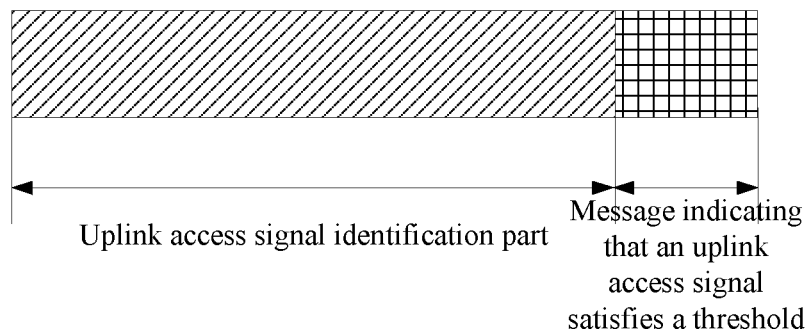
FIG. 21 is a schematic diagram of a principle for an access process in which a first communication node defines a plurality of detection thresholds according to an embodiment of the present disclosure.

FIG. 20 is a schematic diagram of a principle for an access process in which a first communication node defines only one detection threshold according to an embodiment of the present disclosure; and FIG. 21 is a schematic diagram of a principle for an access process in which a first communication node defines a plurality of detection thresholds according to an embodiment of the present disclosure. In each of the abovementioned specific embodiments, a schematic diagram for different numbers of checking threshold values defined by a first node may subject to FIG. 20 and FIG. 21.

Some combined solutions may be generated in a certain combination manner between solutions of all of the abovementioned embodiments, and information of received beams, information bits behind the uplink access signals or quality indicators implying bits to indicate uplink access may be identified by utilizing time domain and frequency domain resource sets of uplink access signals and adopted sequences. The adopted combined solutions of all solutions in the present disclosure fall within the scope of protection of the present disclosure.

The uplink access signals in the present disclosure may be random access signals in an LTE system, the sequences are random access signal Preamble sequences or newly designed uplink access signals or uplink access sequences, and any signals and sequences capable of achieving an uplink access function and/or an uplink synchronization function may fall within the scope of protection of the present disclosure.

There are many modes of detecting, by the terminal, an optimal sequence in the present disclosure, which are all detection implementation modes. For example, a sequence-correlated mode is adopted, and a sequence index having highest correlation value is selected for feedback. Different criteria may select different sequence indexes, and are not thus limitative of the present disclosure. As long as one or more optimal values are obtained and corresponding index values may be obtained, any detection mode fall within the scope of a protection idea.

From the above descriptions, it may be seen that the operation for implementing downlink beam index processing in the present disclosure is as follows.

The base station informs that at least one of the following beam indicating modes and relevant configuration information are adopted when an uplink access signal is transmitted to cover an uplink receiving beam group in a pre-determined manner such as a broadcast and/or high-layer signaling manner:

indicating an uplink access signal group by using a time domain resource set of uplink access signals;

indicating an uplink access signal group by using a frequency domain resource set of uplink access signals;

indicating an uplink access signal group by using an uplink access signal sequence; and indicating the quality of an uplink access signal by carrying indicating bit information in an uplink access signal answer message, wherein indicating bits carried in the uplink access signal answer message may exist in the answer message in an explicit or implicit manner; and the uplink receiving beam group is an uplink receiving beam group for receiving an uplink access signal in a beam forming manner.

In conclusion, regardless of the method, the device or the system, in the present disclosure, the terminal covers the uplink receiving beam group in at least one of a pre-defined manner, a broadcast receiving manner and a high-layer signaling receiving manner according to difference of at least one of a time domain resource set, a frequency domain resource set and an uplink access signal sequence. The base station selects at least one of the time domain resource set, the frequency domain resource set and the used sequence of the uplink access signal to obtain the uplink access signal transmitted by the terminal, and transmits an uplink access answer message after successfully receiving the uplink access signal. The uplink access answer message may carry uplink access signal quality indicating bits and uplink access quality. In such a way, the terminal may obtain an uplink transmitting beam or an optimal uplink transmitting beam satisfying uplink transmission, and the base station may select a beam or an optimal uplink receiving beam satisfying uplink receiving so as to ensure reliable transmission of subsequent information.

Obviously, those skilled in the art shall understand that all of the abovementioned modules or acts in the present disclosure may be implemented by using a general calculation device, may be centralized on a single calculation device or may be distributed on a network composed of a plurality of calculation devices. Alternatively, they may be implemented by using executable program codes of the calculation devices. Thus, they may be stored in a storage device and executed by the calculation devices, the shown or described acts may be executed in a sequence different from this sequence under certain conditions, or they are manufactured into each integrated circuit module respectively, or multiple modules or acts therein are manufactured into a single integrated circuit module. Thus, the present disclosure is not limited to the combination of any specific hardware and software.

The above is only the preferred embodiments of the present disclosure, and not intended to limit the present disclosure. There may be various modifications and variations in the present disclosure for those skilled in the art. Any modifications, equivalent replacements, improvements and the like made within the spirit and principle of the present disclosure shall fall within the scope of protection of the present disclosure.

What is claimed is:

1. A message transmitting method, comprising:
    dividing uplink access signals into a first pre-determined number of uplink access signal groups, wherein the uplink access signal groups correspond to pre-determined uplink access response resources;
    receiving an uplink access signal, which is transmitted in an uplink access beam form based on one or more uplink access signal groups, from a second communication node, wherein the one or more uplink access signal groups are selected by the second communication node according to a division result;
    determining an uplink access signal group to which the uplink access signal pertains, wherein one or more uplink access signals contained in the determined uplink access signal group are transmitted under at least one of the following restriction conditions: a restricted sequence transmitting order, a restricted transmitting occasion, and a restricted transmitting frequency domain position; and
    transmitting an uplink access response message to the second communication node over an uplink access response resource corresponding to the determined uplink access signal group.

2. The method as claimed in claim 1, wherein dividing the uplink access signals into the first pre-determined number of uplink access signal groups comprises at least one of:
    determining an uplink access signal group to which each uplink access signal pertains in a manner of informing, by the first communication node, the second communication node;
    determining an uplink access signal group to which each uplink access signal pertains in a manner of making an appointment between the first communication node and the second communication node.

3. The method as claimed in claim 2, wherein informing, by the first communication node, the second communication node comprises at least one of:
    informing the second communication node via a broadcast channel of the first communication node;
    informing, by one or more other first communication nodes in connection with the second communication node, the second communication node via respective broadcast channels of the one or more other first communication nodes; and
    informing, by one or more other first communication nodes in connection with the second communication node, the second communication node via high-layer signaling.

4. The method as claimed in claim 1, wherein determining the uplink access signal group to which the uplink access signal pertains comprises:
    judging whether at least one of a transmitting occasion, a transmitting order or a transmitting frequency domain position of the uplink access signal has pre-determined correspondence with at least one of a transmitting occasion, a transmitting order or a transmitting frequency domain position of a pre-determined uplink access signal group; and
    when the pre-determined correspondence exists, determining that the uplink access signal pertains to the pre-determined uplink access signal group.

5. The method as claimed in claim 1, wherein transmitting the uplink access response message to the second communication node comprises:
    setting a pre-determined number of detection threshold values, wherein the detection threshold values are used for representing quality of the uplink access signal;
    detecting the received uplink access signal transmitted from the second communication node; and
    transmitting, according to a detection result, a response message containing a detection threshold value corresponding to the detection result to the second communication node; or, when the number of the set detection threshold values is 1, transmitting a response message that does not contain the detection threshold value to the second communication node according to a detection result.

6. The method as claimed in claim 1, wherein dividing the uplink access signals into the first pre-determined number of uplink access signal groups comprises:
    dividing the uplink access signal groups into a second pre-determined number of grades; and
    dividing the uplink access signals into the first pre-determined number of uplink access signal groups according to the divided grades, wherein different numbers of uplink access signals are divided in uplink access signal groups under different grades; the same number of uplink access signals is divided in uplink access signal groups under an identical grade, or the difference of numbers of the uplink access signals divided in the uplink access signal groups under the identical grade is smaller than a pre-determined threshold number.

7. A message receiving method, comprising:
    determining a division result of dividing uplink access signals into a first pre-determined number of uplink access signal groups, wherein the uplink access signal groups correspond to pre-determined uplink access response resources;
    selecting one or more uplink access signal groups according to the division result to transmit an uplink access signal to a first communication node in an uplink access beam form, wherein one or more uplink access signals contained in the selected uplink access signal group are transmitted under at least one of the following restriction conditions: a restricted sequence transmitting order, a restricted transmitting occasion, and a restricted transmitting frequency domain position; and receiving an uplink access response message, which is fed back by the first communication node according to the uplink access signal, over an uplink access response resource corresponding to the selected uplink access signal group.

8. The method as claimed in claim 7, wherein determining the division result of dividing the uplink access signals into the first pre-determined number of uplink access signal groups comprises at least one of:

receiving the division result transmitted by the first communication node and obtained by dividing the uplink access signals by the first communication node;

determining the division result in a manner of making an appointment with the first communication node.

9. The method as claimed in claim 8, wherein the division result transmitted by the first communication node and obtained by dividing the uplink access signals by the first communication node is received in at least one of the following manners:

receiving the division result via a broadcast channel of the first communication node;

receiving the division result via respective broadcast channels of one or more other first communication nodes in connection with a second communication node; and receiving the division result via high-layer signaling of one or more other first communication nodes in connection with a second communication node.

10. The method as claimed in claim 7, wherein selecting the one or more uplink access signal groups according to the division result to transmit the uplink access signal to the first communication node in the uplink access beam form comprises at least one of:

transmitting the uplink access signal to the first communication node according to a sequence transmitting order of the uplink access signal;

transmitting the uplink access signal to the first communication node according to a transmitting occasion of the uplink access signal;

transmitting the uplink access signal to the first communication node according to a transmitting frequency domain position of the uplink access signal.

11. The method as claimed in claim 7, wherein after the uplink access response message fed back by the first communication node according to the uplink access signal is received over the uplink access response resource corresponding to the selected uplink access signal group, the method further comprises:

judging, according to the uplink access response message, whether an uplink transmission signal meeting an uplink transmission requirement exists in the uplink access signal transmitted to the first communication node; and when an uplink transmission signal meeting an uplink transmission requirement exists in the uplink access signal transmitted to the first communication node, stopping transmitting the uplink access signal to the first communication node.

12. The method as claimed in claim 7, wherein selecting the one or more uplink access signal groups according to the division result to transmit the uplink access signal to the first communication node in the uplink access beam form comprises:

selecting at least one uplink access signal group according to measured channel quality and a beam capability; and transmitting the uplink access signal to the first communication node by utilizing the selected uplink access signal group.

13. The method as claimed in claim 12, wherein selecting the at least one uplink access signal group according to the measured channel quality comprises:

when the measured channel quality is higher than a first set threshold, selecting an uplink access signal group containing uplink access signals of which the number is less than a third pre-determined number; and when the measured channel quality is lower than a second set threshold, selecting an uplink access signal group containing uplink access signals of which the number is more than a fourth pre-determined number.

14. The method as claimed in claim 12, wherein the number of the uplink access signals contained in the at least one uplink access signal group is greater than or equal to the number of uplink access signals transmitted to the first communication node.

15. A message transmitting device, comprising a hardware processor arranged to execute program modules comprising:

a division module, arranged to divide uplink access signals into a first pre-determined number of uplink access signal groups, wherein the uplink access signal groups correspond to pre-determined uplink access response resources;

a first receiving module, arranged to receive an uplink access signal, which is transmitted in an uplink access beam form based on one or more uplink access signal groups, from a second communication, wherein the one or more uplink access signal groups are selected by the second communication node according to a division result;

a determination module, arranged to determine an uplink access signal group to which the uplink access signal pertains, wherein one or more uplink access signals contained in the determined uplink access signal group are transmitted under at least one of the following restriction conditions: a restricted sequence transmitting order, a restricted transmitting occasion, and a restricted transmitting frequency domain position; and a first transmitting module, arranged to transmit an uplink access response message to the second communication node over an uplink access response resource corresponding to the determined uplink access signal group.

16. The device as claimed in claim 15, wherein the division module is arranged to:

determine an uplink access signal group to which each uplink access signals pertain in a manner of informing, by the first communication node, the second communication node; and/or, determine an uplink access signal group to which each uplink access signals pertain in a manner of making an appointment between the first communication node and the second communication node;

or, the determination module comprises: a judgment unit, arranged to judge whether at least one of a transmitting occasion, a transmitting order or a transmitting frequency domain position of the uplink access signal has pre-determined correspondence with at least one of a transmitting occasion, a transmitting order or a transmitting frequency domain position of a pre-determined uplink access signal group; and a first determination unit, arranged to determine, when a judgment result of the judgment unit is that the pre-determined correspondence exists, that the uplink access signal pertains to the pre-determined uplink access signal group;

or, the first transmitting module comprises: a setting unit, arranged to set a pre-determined number of detection threshold values, wherein the detection threshold values are used for representing quality of the uplink access signal; a detection unit, arranged to detect the received uplink access signal transmitted from the second communication node; and a first transmitting unit, arranged to transmit, according to a detection result, a response message containing a detection threshold value corresponding to the detection result to the second communication node, or, transmit, when the number of the set detection threshold values is 1, a response message that does not contain the detection threshold value to the second communication node according to a detection result;

or, the division module comprises: a first division unit, arranged to divide the uplink access signal groups into a second pre-determined number of grades; and a second division unit, arranged to divide the uplink access signals into the first pre-determined number of uplink access signal groups according to the divided grades, wherein different numbers of uplink access signals are divided in uplink access signal groups under different grades; the same number of uplink access signals is divided in uplink access signal groups under an identical grade, or the difference of numbers of the uplink access signals divided in the uplink access signal groups under the identical grade is smaller than a pre-determined threshold number.

17. The device as claimed in claim 16, wherein the division module further comprises an informing unit, arranged to inform the second communication node in at least one of the following manners:

informing the second communication node via a broadcast channel of the first communication node;

informing, by one or more other first communication nodes in connection with the second communication node, the second communication node via respective broadcast channels of the one or more other first communication nodes; and informing, by one or more other first communication nodes in connection with the second communication node, the second communication node via high-layer signaling.

18. A message receiving device, comprising a hardware processor arranged to execute program modules comprising:

a determination module, arranged to determine a division result of dividing uplink access signals into a first pre-determined number of uplink access signal groups, wherein the uplink access signal groups correspond to pre-determined uplink access response resources;

a second transmitting module, arranged to select one or more uplink access signal groups according to the division result to transmit an uplink access signal to a first communication node in an uplink access beam form, wherein one or more uplink access signals contained in the selected uplink access signal group are transmitted under at least one of the following restriction conditions: a restricted sequence transmitting order, a restricted transmitting occasion, and a restricted transmitting frequency domain position; and a second receiving module, arranged to receive an uplink access response message, which is fed back by the first communication node according to the uplink access signal, over an uplink access response resource corresponding to the selected uplink access signal group.

19. The device as claimed in claim 18, wherein the determination module comprises at least one of:

a receiving unit, arranged to receive the division result transmitted by the first communication node and obtained by dividing the uplink access signals by the first communication node;

a second determination unit, arranged to determine the division result in a manner of making an appointment with the first communication node;

or, the second transmitting module is further arranged to transmit an uplink access signal to the first communication node in one of the following manners: transmitting the uplink access signal to the first communication node according to a sequence transmitting order of the uplink access signal; transmitting the uplink access signal to the first communication node according to a transmitting occasion of the uplink access signal; and transmitting the uplink access signal to the first communication node according to a transmitting frequency domain position of the uplink access signal;

or, the hardware processor is arranged to execute program modules comprising: a judgment module, arranged to judge, according to the uplink access response message, whether an uplink transmission signal meeting an uplink transmission requirement exists in the uplink access signal transmitted to the first communication node; and a stopping module, arranged to stop, when a judgment result of the second judgment module is that an uplink transmission signal meeting an uplink transmission requirement exists in the uplink access signal transmitted to the first communication node, transmitting the uplink access signal to the first communication node;

or, the second transmitting module comprises: a selection unit, arranged to select at least one uplink access signal group according to measured channel quality and a beam capability; and a second transmitting unit, arranged to transmit the uplink access signal to the first communication node by utilizing the selected uplink access signal group.

20. The device as claimed in claim 19, wherein the receiving unit is arranged to receive the division result transmitted by the first communication node and obtained by dividing the uplink access signals by the first communication node in at least one of the following manners:

receiving the division result via a broadcast channel of the first communication node;

receiving the division result via respective broadcast channels of one or more other first communication nodes in connection with a second communication node; and receiving the division result via high-layer signaling of one or more other first communication nodes in connection with a second communication node.

21. The device as claimed in claim 19, wherein the selection unit comprises:

a first selection sub-unit, arranged to select, when the measured channel quality is higher than a first set threshold, an uplink access signal group containing uplink access signals of which the number is less than a third pre-determined number; and a second selection sub-unit, arranged to select, when the measured channel quality is lower than a second set threshold, an uplink access signal group containing uplink access signals of which the number is more than a fourth pre-determined number;

or, the number of the uplink access signals contained in the at least one uplink access signal group is greater than or equal to the number of uplink access signals transmitted to the first communication node.

* * * * *